United States Patent [19]

Tomita et al.

[11] Patent Number: 5,459,485
[45] Date of Patent: Oct. 17, 1995

[54] IMAGE AND SOUND PROCESSING APPARATUS

[75] Inventors: Masahide Tomita; Mitsuhiro Takahashi, both of Hokkaido, Japan

[73] Assignee: Hudson Soft Co., Ltd., Hokkaido, Japan

[21] Appl. No.: 113,920

[22] Filed: Aug. 31, 1993

[30] Foreign Application Priority Data

| Oct. 1, 1992 | [JP] | Japan | 4-284976 |
| Oct. 1, 1992 | [JP] | Japan | 4-284979 |
| Oct. 1, 1992 | [JP] | Japan | 4-284982 |
| Oct. 5, 1992 | [JP] | Japan | 4-290806 |

[51] Int. Cl.$^6$ .............. G09G 5/02; G09G 1/28
[52] U.S. Cl. .............. 345/150; 345/119; 345/203
[58] Field of Search .............. 345/150, 153, 345/155, 119, 203

[56] References Cited

U.S. PATENT DOCUMENTS

| 4,862,150 | 8/1989 | Katsura et al. | 345/153 |
| 4,864,289 | 9/1989 | Nishi et al. | 345/150 |
| 5,091,723 | 2/1992 | Kanno et al. | 345/94 |
| 5,095,301 | 3/1992 | Guttag et al. | 345/155 |

*Primary Examiner*—Jeffery Brier
*Attorney, Agent, or Firm*—Lowe, Price, LeBlanc & Becker

[57] ABSTRACT

A RAM is accessed for each dot of an image to be displayed in accordance with a dot clock signal, and is accessed for each block in accordance with a system clock signal. These clock signals are selected to be used depending on the type of image data to be displayed in accordance with a microprogram.

5 Claims, 39 Drawing Sheets

FIG. 7 PRIOR ART
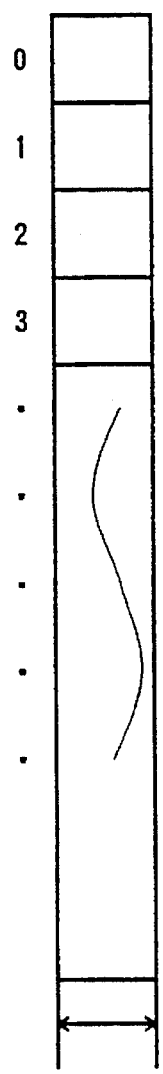
2 bits
4 COLOR MODE
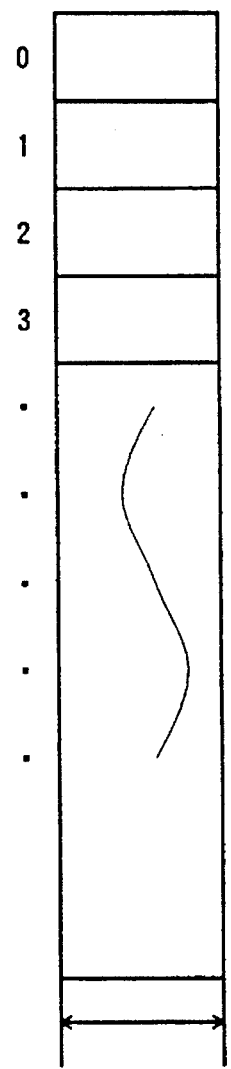
4 bits
16 COLOR MODE
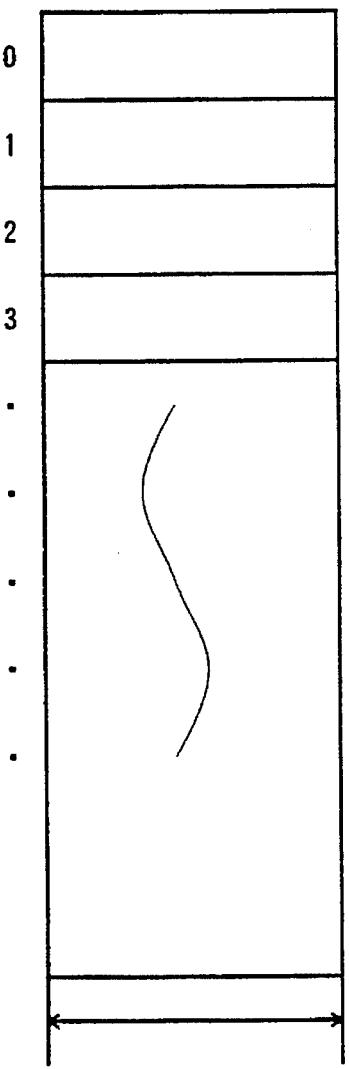
8 bits
256 COLOR MODE

FIG. 9  PRIOR ART

BAT

| 15 | 12 | 11 | 0 |
|---|---|---|---|
| PALLET BANK | | CHARACTER CODE | |

FIG. 10  PRIOR ART 8 dots 1 character 8 dots

| P0,0 | P1,0 | | | | | | P7,0 |
|---|---|---|---|---|---|---|---|
| P0,1 | P1,1 | | | | | | P7,1 |
| | | | | | | | |
| | | | P(i,j) | | | | |
| | | | | | | | |
| | | | | | | | |
| | | | | | | | |
| P0,7 | P1,7 | | | | | | P7,7 |

FIG. 11 *PRIOR ART*

4 COLOR MODE

FIG. 19
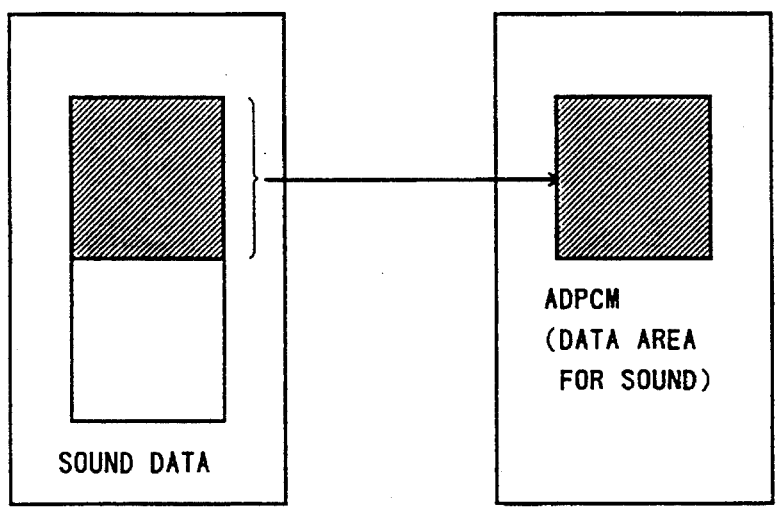
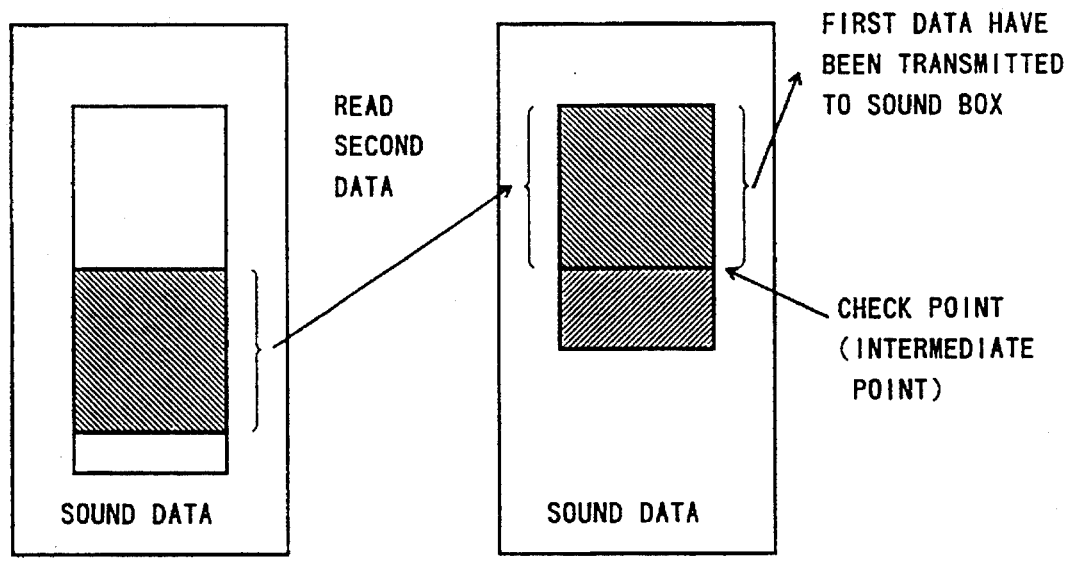

FIG. 21A
MICROPROGRAM CONTROL REGISTER
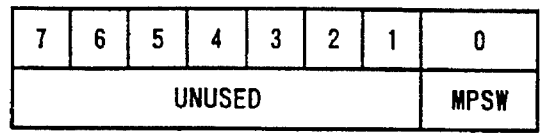
FIG. 21B
MICROPROGRAM LOAD ADDRESS REGISTER
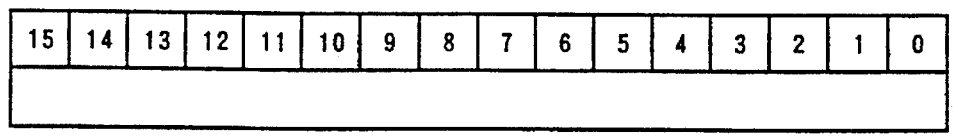
FIG. 21C
MICROPROGRAM DATA REGISTER
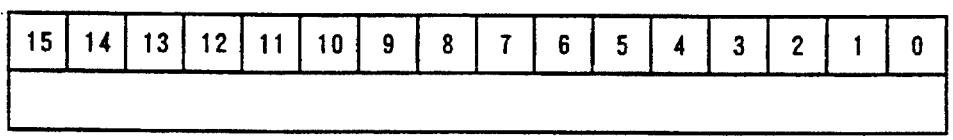
FIG. 21D
MICROPROGRAM STORAGE AREA ( 1 Word = 9 bits )
|         | B | A |
|---------|---|---|
| cycle 0 | 8 | 0 |
| cycle 1 | 9 | 1 |
| ⋮       | ⋮ | ⋮ |
| cycle 7 | F | 7 |

FIG. 22

MICRO-POGRAM DATA REGISTER

| 15 | 9 | 8 | 7 | 6 | 5 | 4 | 3 | 2 | 1 | 0 |
|---|---|---|---|---|---|---|---|---|---|---|
| UNUSED | | NOP/-NOP | BG SCREEN No. | | ROTATION/NON-ROTATION | BAT/-CG | IN-DIRECT/-DIRECT | | CG OFFSET | |

FIG. 25

| | A-BUS DATA | B-BUS DATA |
|---|---|---|
| 0 CYCLE | NOP | BG0 INDIR CG (0) |
| 1 CYCLE | BG2 CG DIR (0) | BG0 INDIR CG (1) |
| 2 CYCLE | BG2 CG DIR (1) | BG0 INDIR CG (2) |
| 3 CYCLE | NOP | BG0 INDIR CG (3) |
| 4 CYCLE | NOP | BG0 INDIR CG (0) |
| 5 CYCLE | NOP | BG0 INDIR CG (1) |
| 6 CYCLE | BG0 BAT | NOP |
| 7 CYCLE | BG1 BAT | NOP |

FIRST REWRITE LINE

FIG. 34

BGn MAIN/SUB-PICTURE BAT ADDRESS REGISTER

| 7 | 6 | 5 | 4 | 3 | 2 | 1 | 0 |
|---|---|---|---|---|---|---|---|
| -A/B | A16 | A15 | A14 | A13 | A12 | A11 | A10 |

CGn MAIN/SUB-PICTURE CG ADDRESS REGISTER

| 7 | 6 | 5 | 4 | 3 | 2 | 1 | 0 |
|---|---|---|---|---|---|---|---|
| -A/B | A16 | A15 | A14 | A13 | A12 | A11 | A10 |

IMAGE AND SOUND PROCESSING APPARATUS

BACKGROUND OF THE INVENTION

The present invention relates to an image and sound processing apparatus, and more particularly to a game computer system processing a variety of image and sound data.

Recently, a game computer system manages plural types of data, that is, external block and dot sequence types, and an internal dot sequence type. Further, plural BG (background) pictures are processed to be superimposed in the computer system. In a conventional game computer, these data are processed in a HSYNC or VSYNC period. Therefore, according to the conventional system, it is difficult to process the BG data for each block at a high speed, because a variety types of data must be processed in the HSYNC or VSYNC period.

For example, when image data for a natural picture is processed, a RAM is accessed for each block of the image in an interrupt period, and an area of the RAM corresponding to dots needed to be processed is accessed in the block accessing period. In this case, it is sufficient to access only the dots needed to be processed without the block access, so that the access time is decreased. If dot accessing is realized by forming a special circuit in the system, the circuit becomes very large.

In the conventional computer system, the current address of a RAM is renewed by the CPU using a predetermined program or an increment operation. The increment process is not suitable for a multi-media computer such as a game computer treating a variety of data such as graphic, video, general, sound, etc. According to the conventional game computer, the same data arrangement of the RAM is used for any data mode; however, it is not effective use of the RAM.

In the conventional computer system, the background image is managed by using a BAT (background attribute table) and a CG (character generator) in a VRAM. According to the conventional computer system, the size and position of the BAT in the RAM are fixed, and therefore, a useless area is formed in the RAM, because the size of the image data varies depending on the type and kind of the data.

In game computer systems, it is necessary that the position where the data are currently read in the memory be monitored by a user program, when the data are continuously processed. That is easy to realize if the data are read directly; however, it is impossible to directly monitor the current position when the RAM is accessed automatically at a predetermined interval. In the conventional game computer, the current position must be calculated based on the elapsed time, and as a result, the CPU must perform much processing.

SUMMARY OF THE INVENTION

Accordingly, it is an object of the present invention to provide an image and sound processing apparatus in which a memory may be accessed at a suitable timing for any type of data.

It is another object of the present invention to provide an image and sound processing apparatus in which a memory is adaptable to plural modes of data.

It is still another object of the present invention to provide an image and sound processing apparatus in which a memory may be used effectively when plural BG (background) pictures are superimposed therein.

It is still another object of the present invention to provide an image and sound processing apparatus by which continuous processing of data may be performed at a high speed.

According to a first feature of the present invention, a memory is accessed for each dot in accordance with a first clock signal, and is accessed for each block in accordance with a second clock signal. The first and second clock signals are selected to be used depending on the type of an image data to be displayed. This processing is realized by a macro instruction in a microprogram.

According to a second feature of the present invention, image data are managed by different arrangements of data in a memory depending on the data mode. An address of a memory to be accessed is specified in accordance with a current data mode. Specifically, the address to be accessed is calculated in accordance with an instruction held in a register. The register is supplied with information on initial and incremental values of the address and whether to read or write by a microprogram, so that data access is carried out automatically. The incremental value is calculated by a special device.

According to a third feature of the present invention, plural BG (background) pictures each managed by a BAT (Background Attribute Table) in a memory are superimposed. A start address of the BAT is held in registers, and the start address is changed depending on the size of the BG picture.

According to a fourth feature of the present invention, an access point in a memory is transferred from an end address to a start address when the data at the end address have been processed. An interrupt signal is generated when the access point reaches the end address or an intermediate address between the start and end addresses. A predetermined interrupt processing is carried out in accordance with the interrupt signal.

BRIEF DESCRIPTION OF THE DRAWINGS

FIG. 7 is a diagram showing the arrangements of the memory operating in 4, 16 and 256 color modes, according to the conventional computer system.

FIG. 9 is a diagram showing the data arrangement of the BAT according to the conventional system.

FIG. 10 is a diagram showing the configuration of one character of the BG image, according to the conventional system.

FIG. 11 is a diagram showing the configuration of the

FIG. 19 is a diagram showing an operation for reading the sound data from CD-ROM, according to the invention.

FIGS. 21A, 21B and 21C are diagrams showing the configurations of microprogram control, microprogram load address and microprogram data registers, respectively, according to the invention.

FIG. 21D is a diagram showing a storage area used by the microprogram according to the invention.

FIG. 22 is a diagram showing the data arrangement of the microprogram data register, shown in FIG. 22, according to the invention.

FIG. 25 is a diagram showing the content of the microprogram according to the invention.

FIG. 34 is a diagram showing the content of a start address register of the K-RAM according to the invention.

DETAILED DESCRIPTION OF THE INVENTION

For better understanding of the invention, a conventional technology will be described before describing preferred embodiments.

In a conventional game computer, background (BG) and sprite (SP) data are superimposed to display an image.

Figure 1:
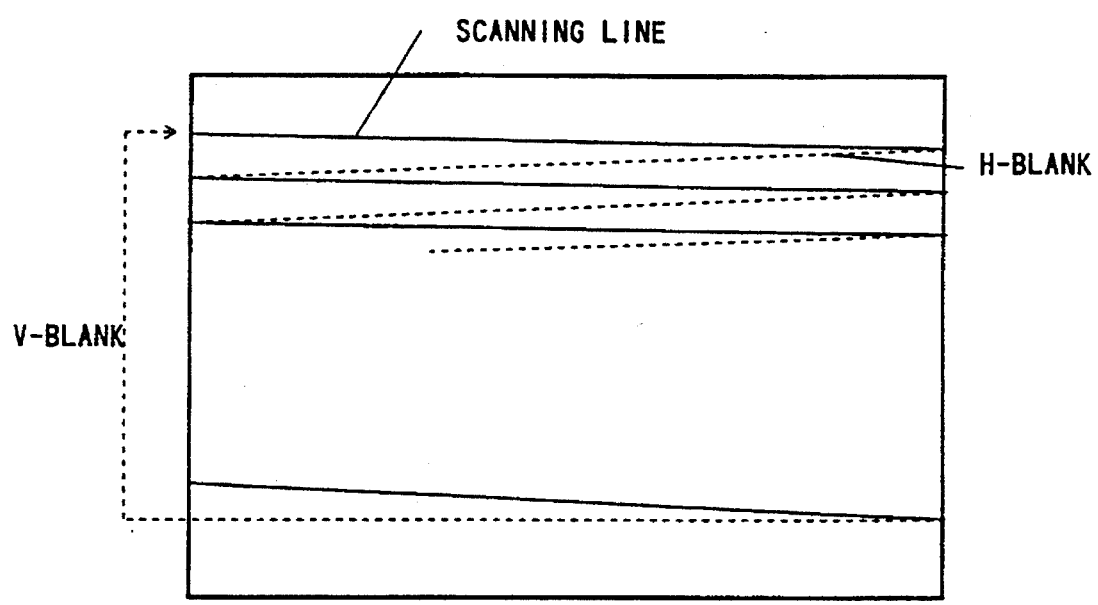
FIG. 1 is a diagram showing operation for scanning on a CRT display, according to a conventional computer system.

FIG. 1 shows a TV screen. In this screen, a scanning line is moved left to right, and up and down. When the scanning line reaches at the right edge, the line backs to the left edge at a point just below the previous point in a H-blank period (HSYNC). This process is repeated top to bottom. When the scanning line reaches at the bottom, the line returns up to the top in a V-blank period (VSYNC). In the H and V-blank periods, no image is displayed on the TV screen. Generally, interrupt operations are performed in accordance with HSYNC and VSYNC signals, which are generated in the H and V-blank periods, respectively. In game computers, interrupt operations are mostly performed in the V-blank periods, because the V-blank period is longer than the H-blank period.

In the conventional game computer, the BG data are processed in the V-blank periods, and therefore, the access timing of the BG data is limited.

Figure 2:
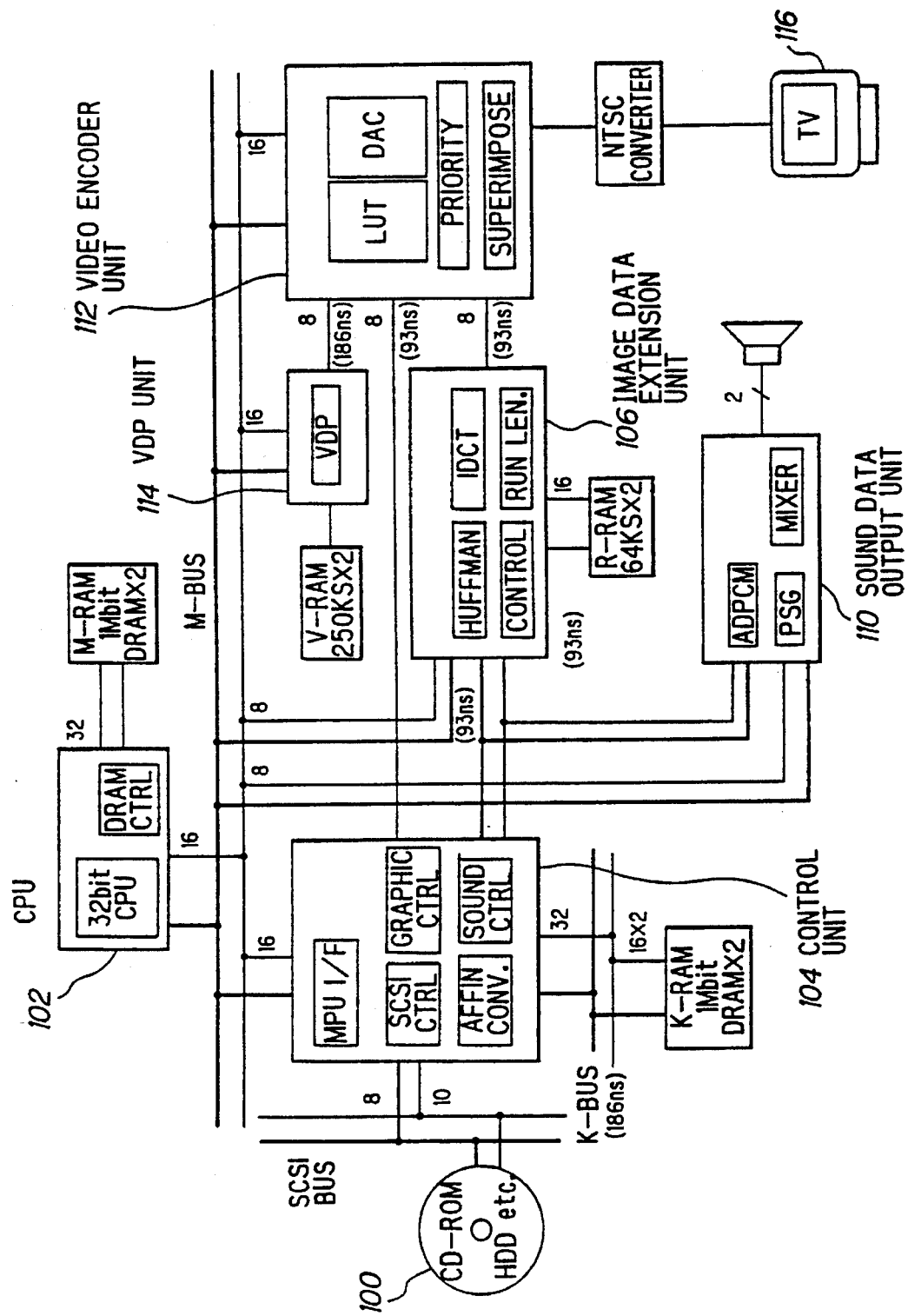
FIG. 2 is a block diagram showing the conventional computer system.

FIG. 2 shows the conventional computer system. The system includes a game-software recording medium 100 such as a CD-ROM, a CPU 102 of the 32-bit type, a controller chip 104 for mainly controlling transmission of image and sound data and interfacing most devices to each other, an image data extension unit 106, an image data output unit, a sound data output unit 110, a video encoder unit 112, a VDP unit 114 and a TV display 116.

CPU 102, controller chip 104, image data extension unit 106 and VDP unit 114 are provided with their own memories M-RAM, K-RAM, R-RAM and V-RAM, respectively.

Figure 3:
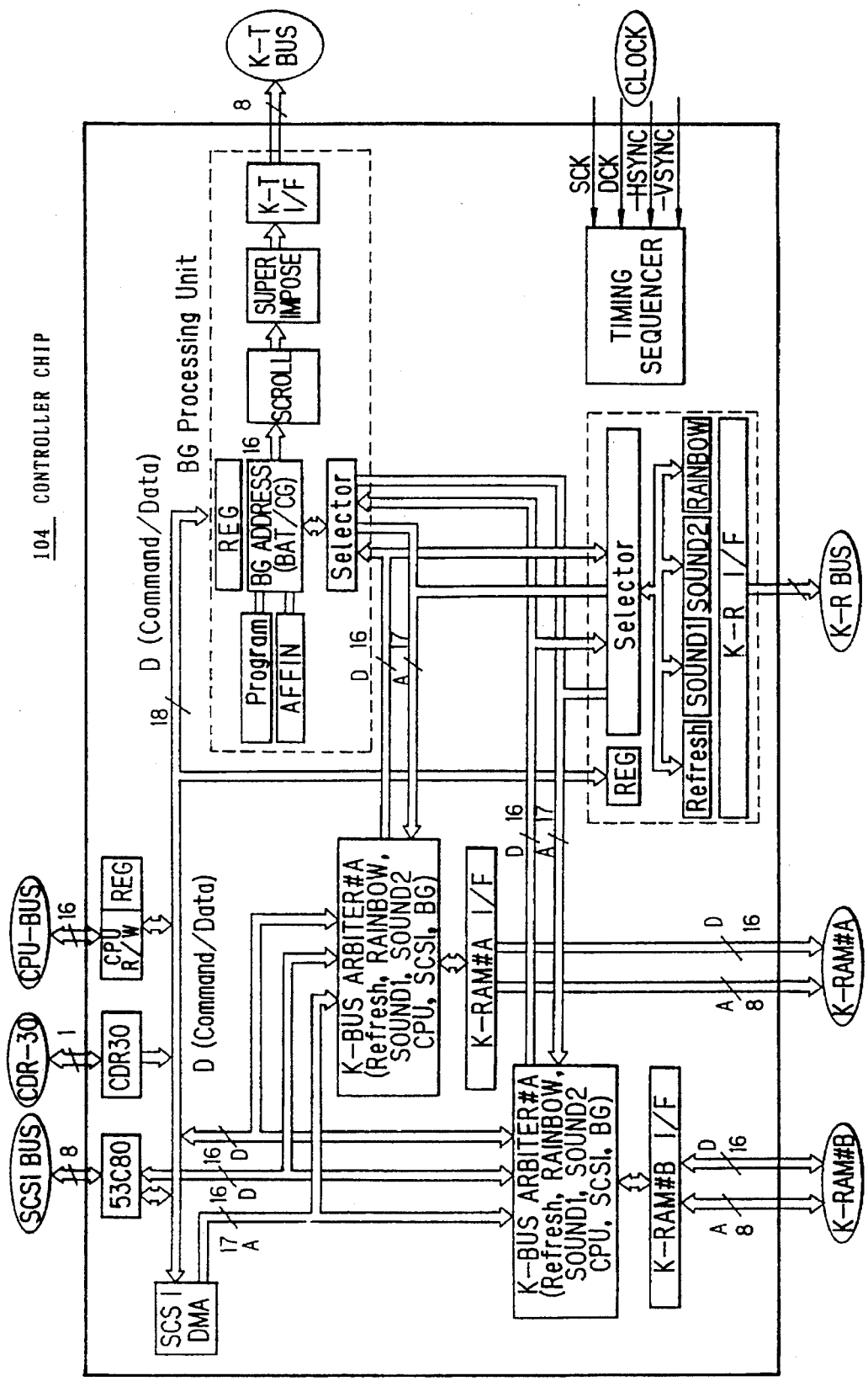
FIG. 3 is a block diagram showing a controller chip used in the computer system shown in FIG. 2.

As shown in FIG. 3, the controller chip includes an SCSI controller, a graphic controller and a sound controller. Data supplied to the SCSI controller is buffered in the K-RAM, which stores a variety of data such as 8 bit data and 16 bit data. The BG data stored in the K-RAM are supplied through the controller chip 104 to the video encoder 112. The video encoder processes image data supplied from the controller chip and the other devices to display the image data on the TV monitor 116. The video encoder operates in accordance with display control signals VSYNC, HSYNC, DCK and SCK (system clock), the SCK being produced by the other signals. The system clock is produced based on an "OD/-EV" signal (odd/even field judgement signal) supplied from the video encoder in an interlace mode.

FIG. 3 depicts details of a prior art controller chip 104, shown in FIG. 2.

Figure 4:
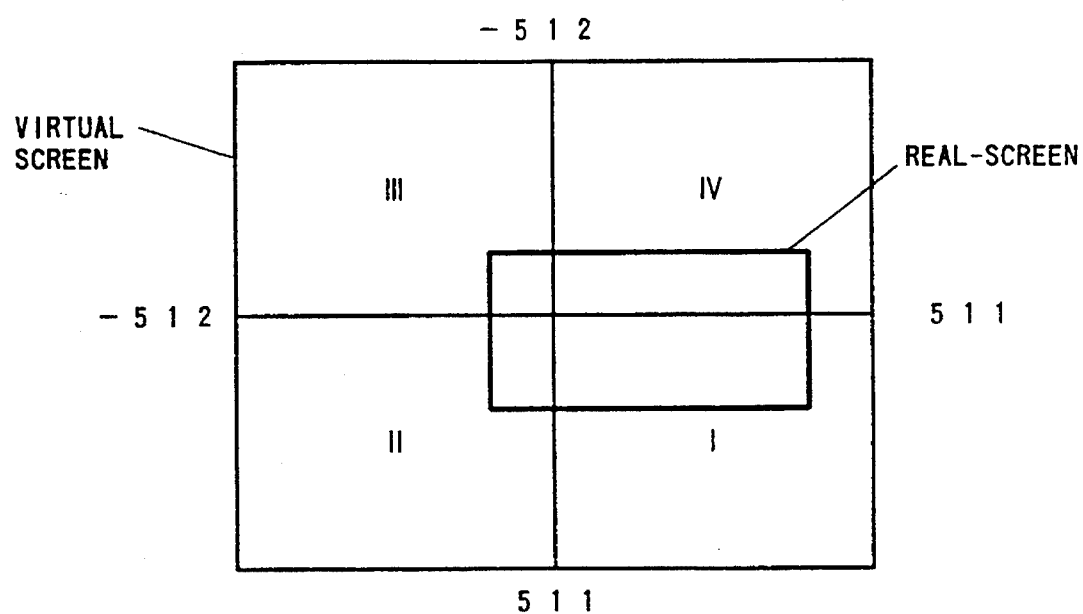
FIG. 4 is a diagram showing a relation between virtual and real screens processed in the conventional computer system.

FIG. 4 shows a virtual screen for the background image, which is managed on a coordinate system called an "image screen coordinate." The virtual screen is composed of 1024× 1024 dots, that is, −512 to +512 dots in each of horizontal (X) and vertical (Y) directions. In the virtual screen, a real screen is ensured as 256×244 dots. When the real screen area is moved to up-and-down and right-and-left in the virtual screen, the image shown in the virtual screen is scrolled on the real screen (TV display).

The background and sprite images are divided into plural character patterns and sprite patterns, respectively. For example, each character and sprite are composed of "8×8" dots and "16×16" dots, respectively. A position of each character is defined by a raster and a character pitch in the real screen (CRT). That is, the background image may be defined by the positions, colors and patterns of the characters. The positions of the characters to be displayed are indicated on the coordinates for the CRT.

Figure 5:
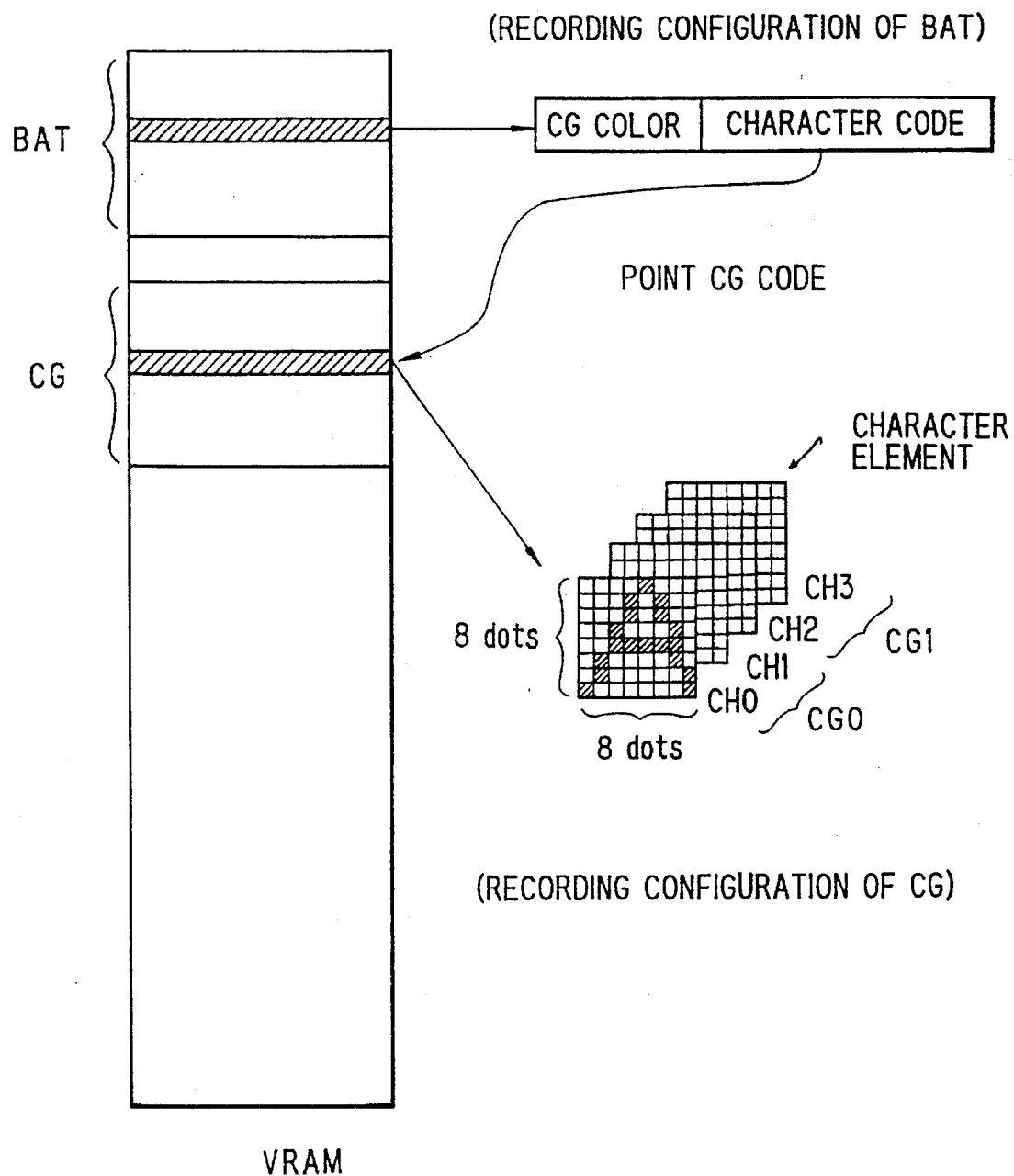
FIG. 5 is a diagram showing the configuration of a VRAM used in the conventional computer system.

The background image is managed by using a background attribute table (BAT) and a character generator (CG) in the memory (RAM), as shown in FIG. 5. The BAT includes a CG color of 4 bits and a character code of 12 bits to specify positions and colors of the characters to be displayed. The CG is incorporated in the RAM for storing four actual character patterns corresponding to CG codes in the BAT. Each character pattern is defined by points of 8×8 dots and 16 colors.

Figure 6:
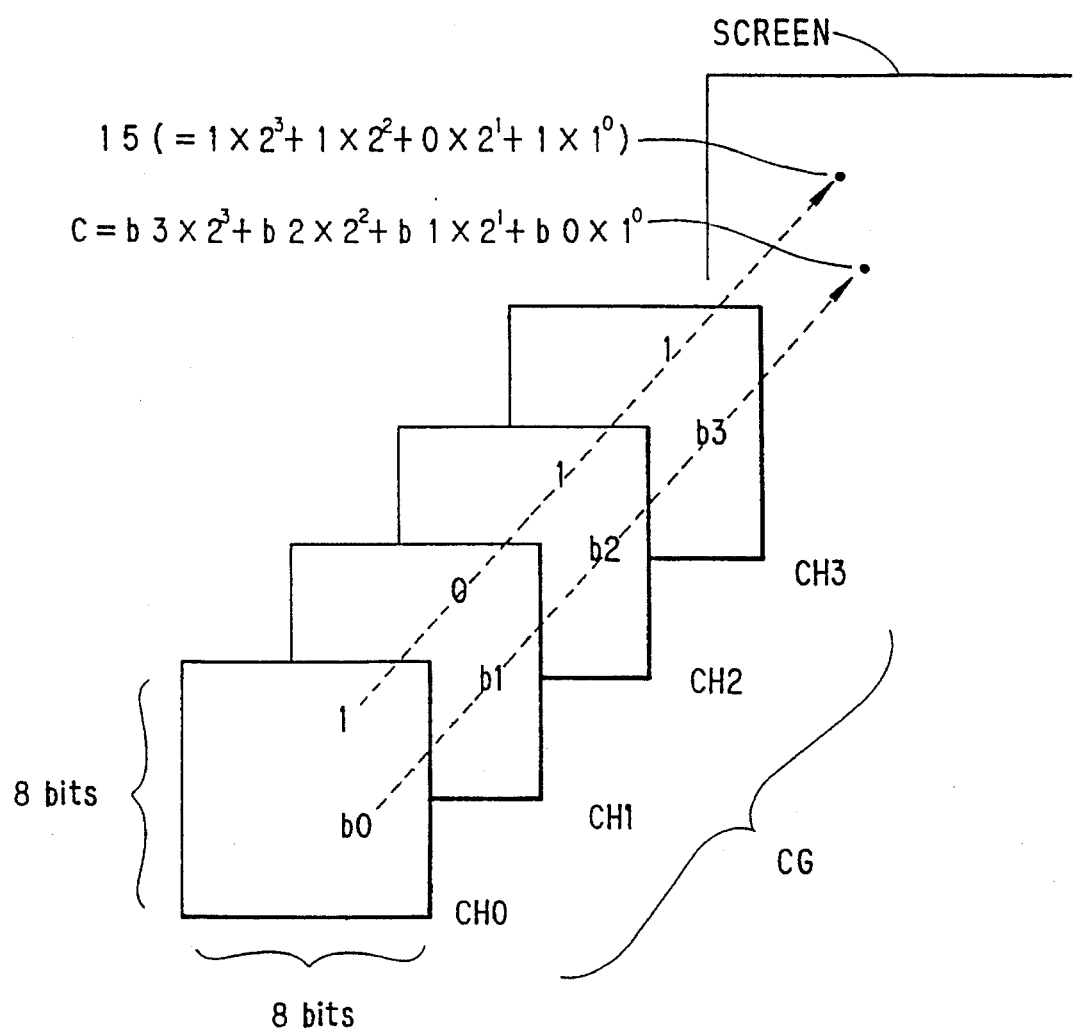
FIG. 6 is a diagram showing a relation between BAT and CG shown in FIG. 5.

The color of each character block is defined dot by dot, and the color of each dot is defined by total bits of all the corresponding dots on each character elements CH0 to CH3, as shown in FIG. 6. Specifically, when the corresponding dots of character elements CH0 to CH3 are indicated by b0, b1, b2 and b3, a color "C" of the dot to be displayed is given by an equation "$C=b0\times2^0+b1\times2^1+b2\times2^2+b3\times2^3$". It can be considered that the color "C" may be directly treated as a color code itself; however, the conventional game computer uses a color pallet which stores plural color codes to manage colors of the background image so that many colors may be used for displaying one background image. The color pallet is specified in position by the color codes of the CG. The character code in the BAT indicates the address in the CG.

In this system, the memory arrangement is changed depending on the color mode.

FIG. 7 shows the memory arrangements for the 4, 16 and 256 color modes.

In the computer system, a combination of "external block," "external dot" and "internal dot" types data are used to form the background image.

According to the internal dot sequence type data, a natural picture supplied from an image scanner or the like is directly displayed by a bit-map technique. Therefore, the BAT is not necessary for that type data.

On the other hand, the other two types of data are image data managed by the BAT and CG in the VRAM. According to the external block sequence type data, the CG indicates a character pattern in the same manner as the conventional system. According to the external dot sequence type data, the CG is used for each dot.

Figure 8:
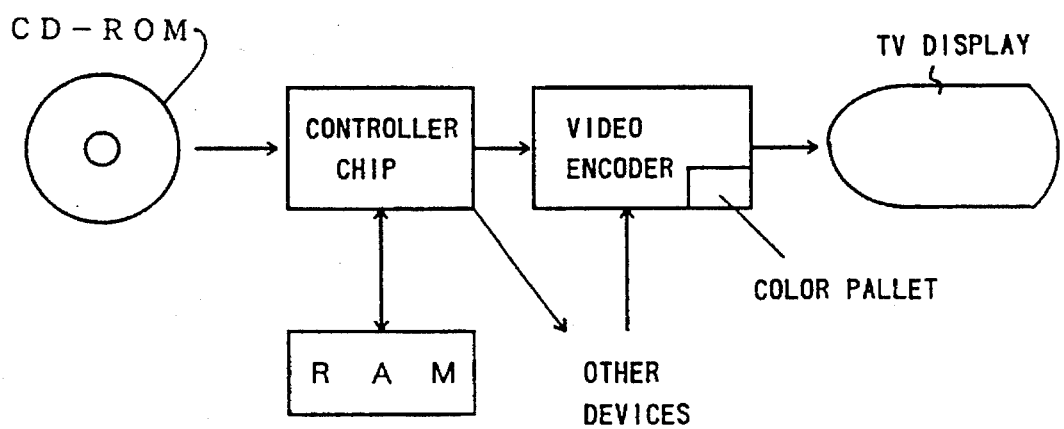
FIG. 8 is a block diagram showing display processing for BG image data according to the conventional system.

The image data generated from the three types of data are supplied through the video encoder to the TV display, as shown in FIG. 8.

The three types of image data are now explained.
(1) EXTERNAL BLOCK SEQUENCE TYPE FIG. 9 shows the BAT (background attribute table) which is composed of a pallet bank and a character code. The pallet bank stores data corresponding to a bank stored in the video encoder, the pallet bank corresponding to the "CG COLOR" shown in FIG. 5. The color pallet includes color groups each composed of 16 colors, the color groups being selected in accordance with data stored in the pallet bank.

The pallet bank is effective in 4 and 16 color modes only, and other color modes are neglected. The character code is used for specifying the CG, whereby a CG address is defined by the character code and data held in a CG address register. Each character pattern is defined by 64 dots of "8×8" by the CG. A bits number "n" needed for displaying each dot is given by the following equation, where colors of the number "m" are used simultaneously to display the dot. The numbers of dots that must be used to define a color for one dot are different depending on the color mode.

$n=Log_2 m$

When "m" indicates 4, 16, 256, 64k or 16M, "n" becomes 2, 4, 8, 16 and 24. The RAM is arranged to be addressed by 16 bits (=1 word), so that 2 dots are indicated by 32 bits when "m =16M".

FIG. 10 shows a character matrix, where (i, j) and "p" represent the position (line, column) and the pallet number of the dot, respectively.

Figure 11:
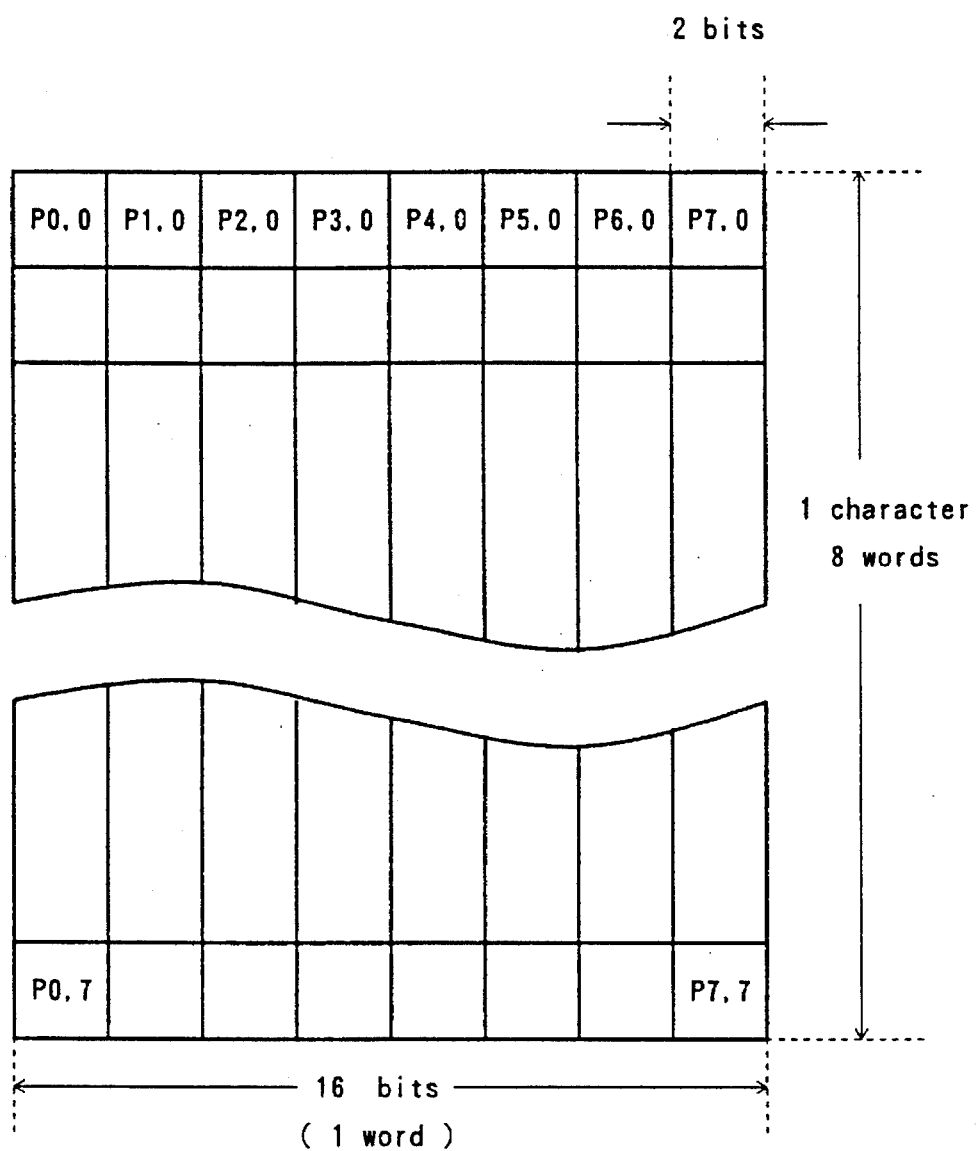
Figure 12:
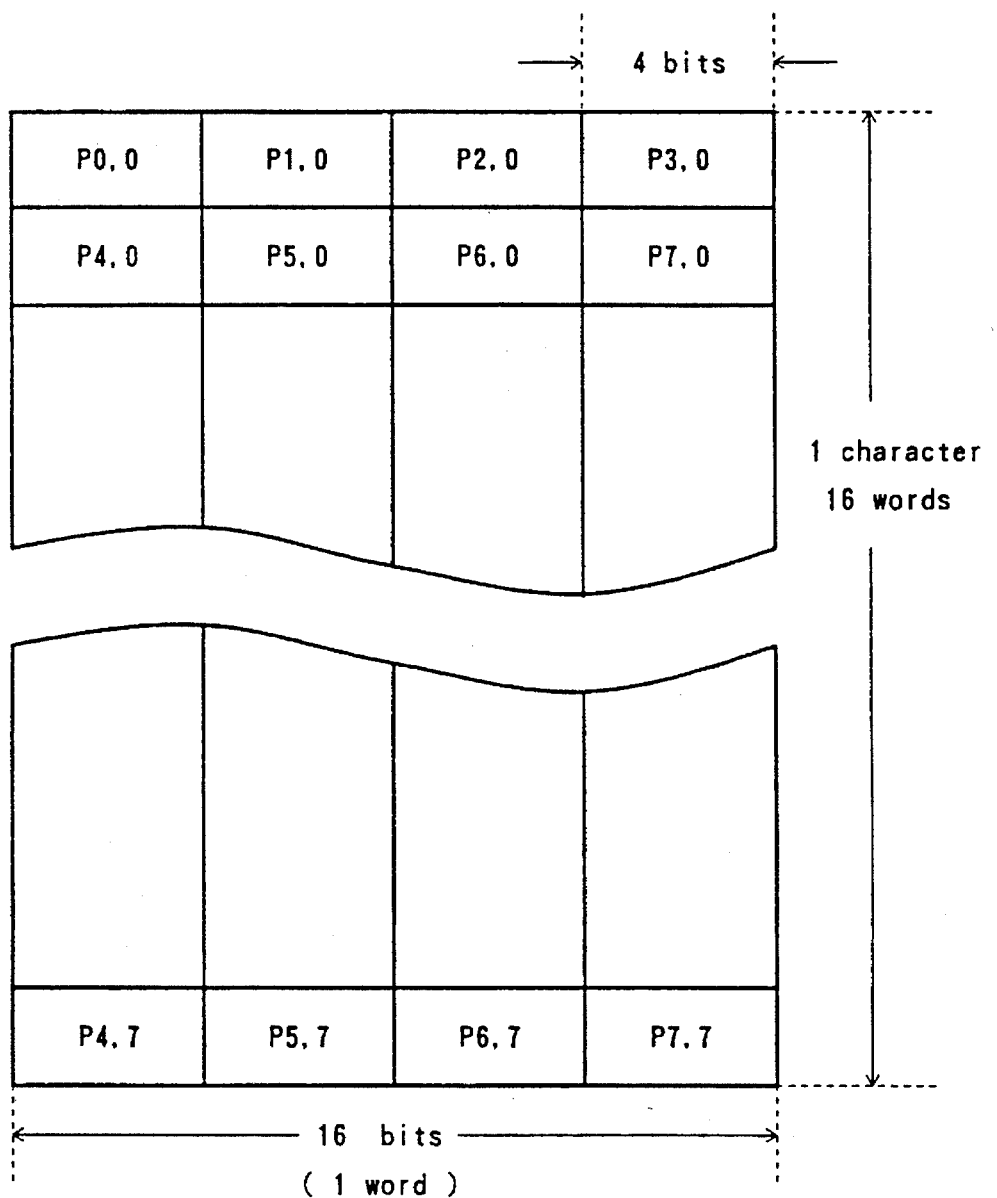
FIG. 12 is a diagram showing the configuration of the RAM in the 16 color mode according to the conventional system.
Figure 13:
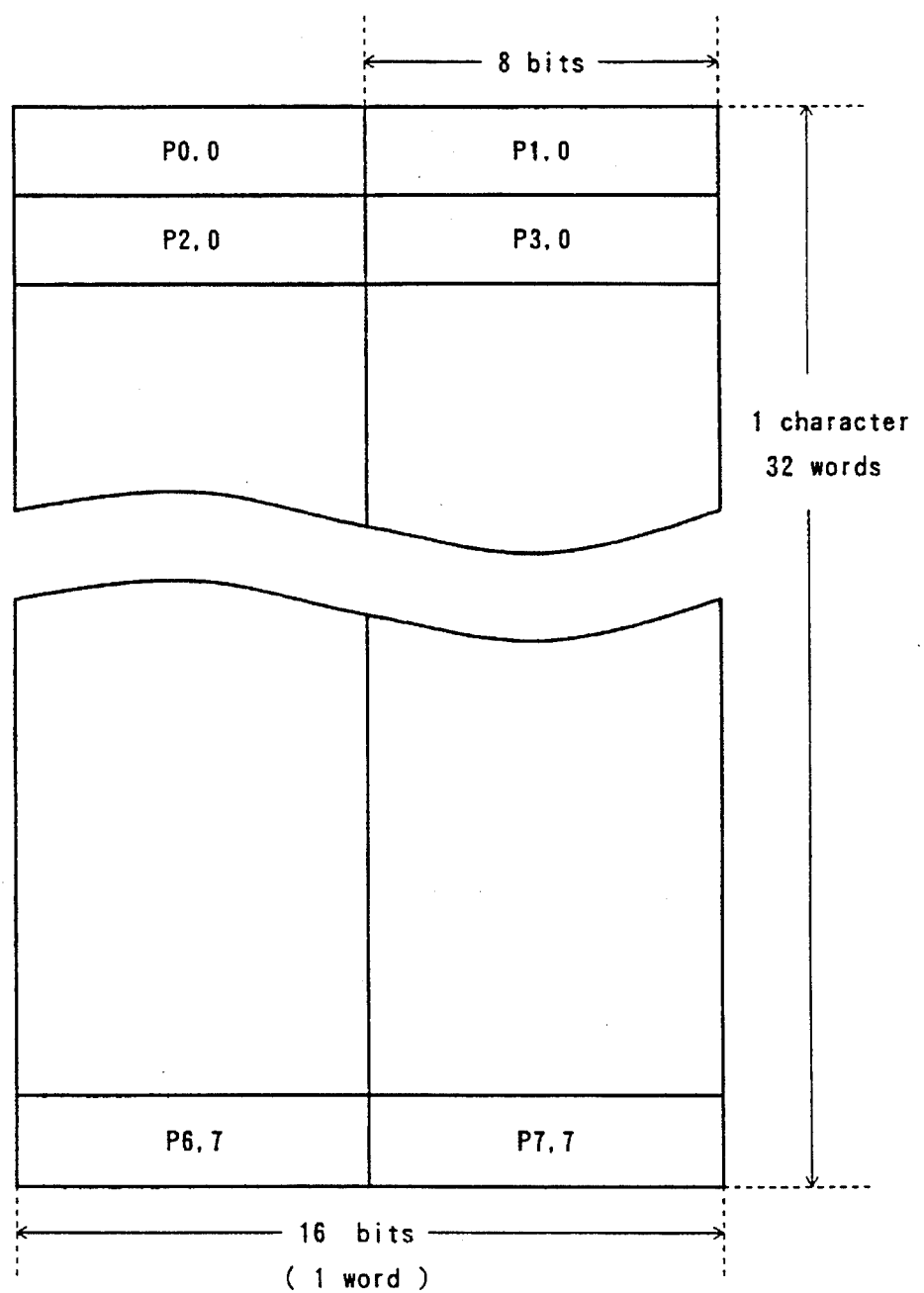
FIG. 13 is a diagram showing the configuration of the RAM in the 256 color mode according to the conventional system.

FIGS. 11, 12 and 13 show the bit structures of the RAM in 4, 16 and 256 color modes, respectively. In accordance with the RAM structures, the positions on the color pallet, which are used for specifying a color to be displayed, are defined. The color pallet has a capacity of 256 colors, so that the color pallet may be pointed directly in the 256 color mode. In other words, the pallet bank is not necessary in the 256 color mode.

Figure 14:
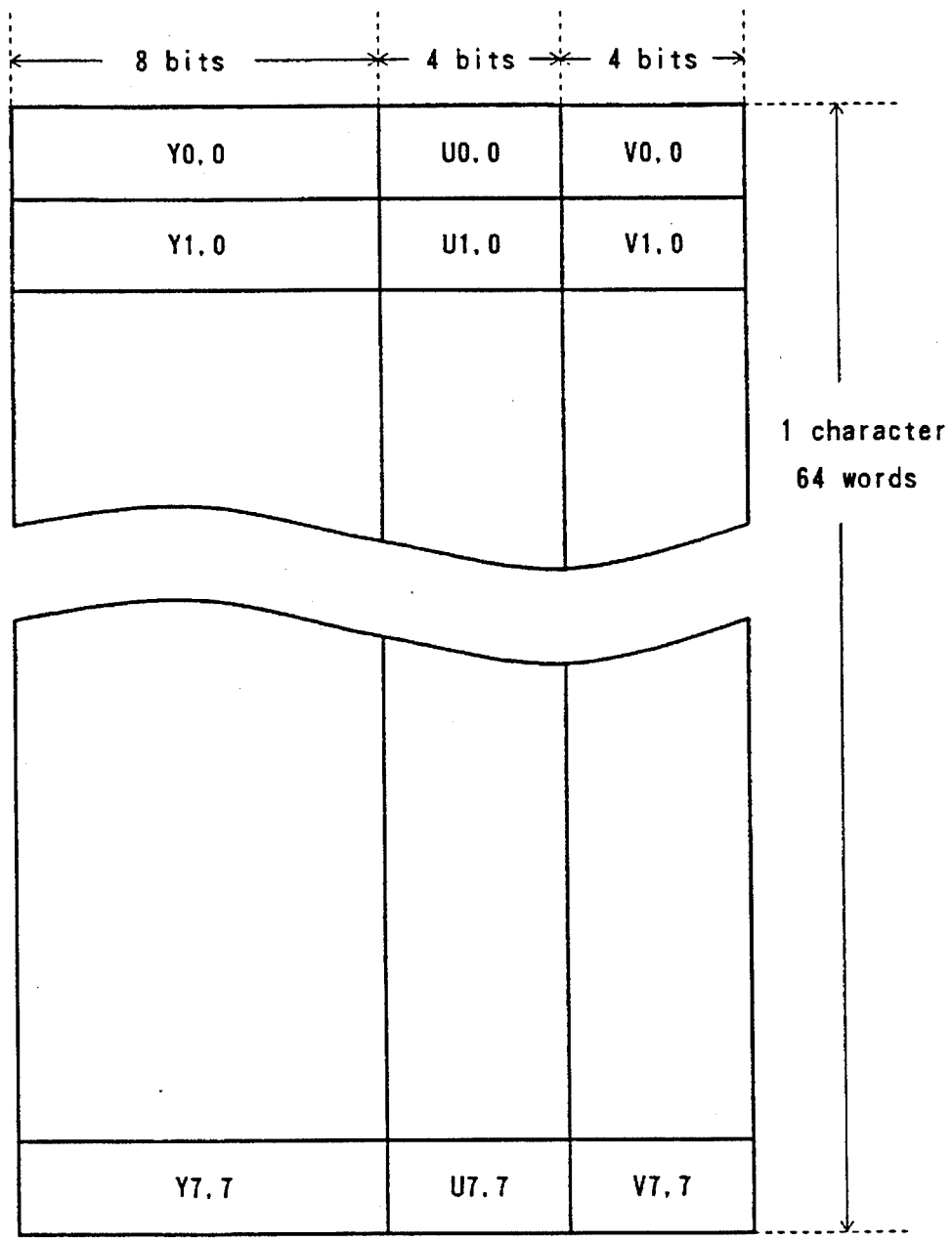
FIG. 14 is a diagram showing the configuration of the RAM in a 64K color mode according to the conventional system.
Figure 15:
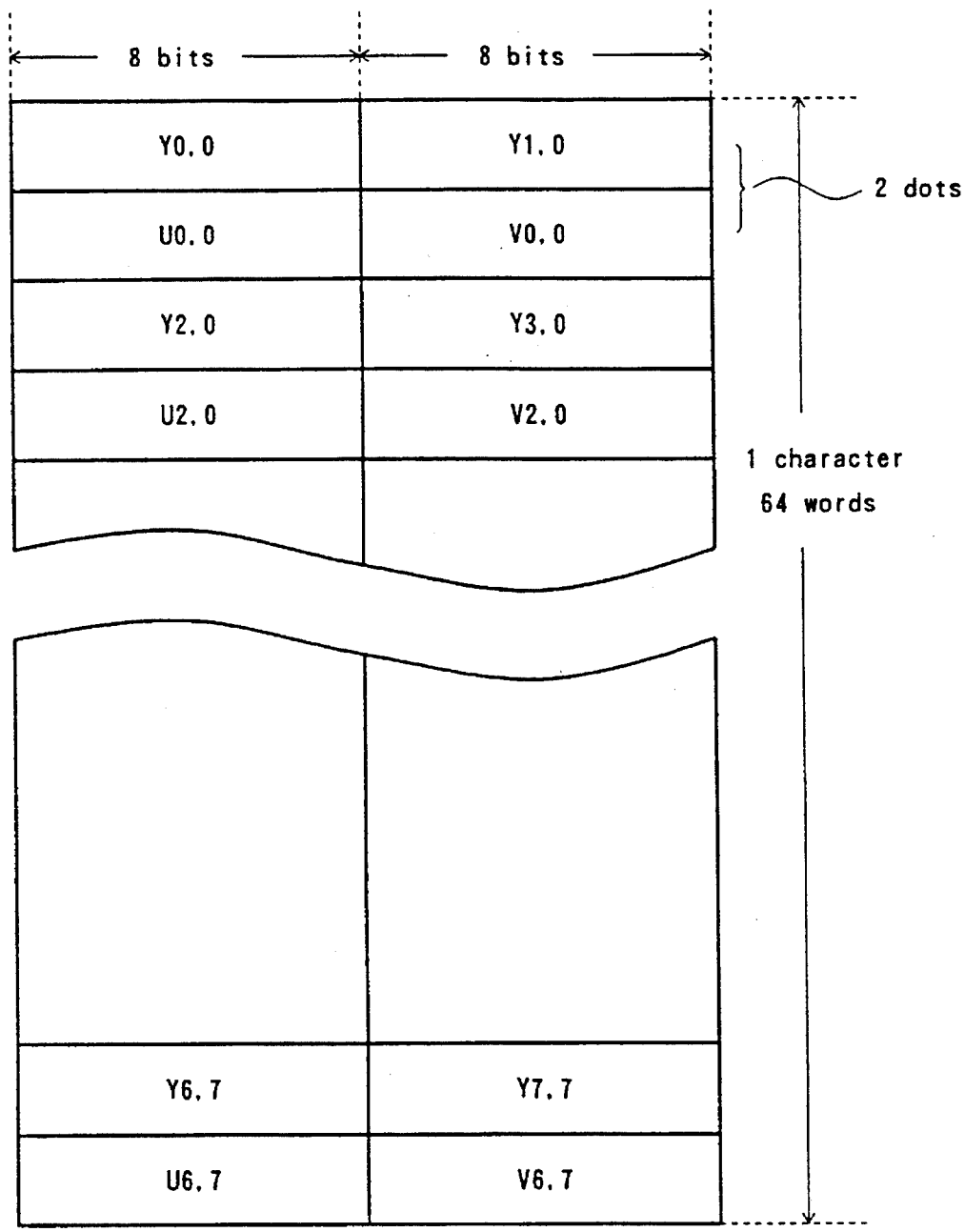
FIG. 15 is a diagram showing the configuration of the RAM in a 16M color mode according to the conventional system.

FIGS. 14 and 15 show the structures of the RAM in 64K and 16M color modes, respectively. In these color modes, color data are specified directly without using the color pallet. In the 64K color mode, one dot color data are specified by YUV (Y of 8 bits, U of 4 bits and V of 4 bits). In the 16M color mode, two dots color data are specified by YYUV (Y of 8 bits, Y of 8 bits, U of 8 bits and V of 8 bits). The first "Y" represents the brightness of a first dot, the second "Y" represents the brightness of a second dot and "U" and "V" represent the common color shift of the first and second dots.

In a natural picture, colors of successive dots are not very different from each other, and therefore, the next dots may be separated by adjusting the brightness thereof. As a result, character patterns may be defined by using small data. Specifically, the character pattern may be defined by 64 word data, which is the same as that in 64 k color mode. According to the external dot sequence system, the conventional BG image data may be used as they are.
(2) EXTERNAL DOT SEQUENCE TYPE The external dot sequence process is basically equal to the external block sequence process; however, image data are processed dot-by-dot, not block-by-block (character-by-character). Therefore, only one line in the tables shown in FIGS. 10 to 15 is used to define the CG. In the 16M color mode, two lines are used to define two dots. The external dot sequence process is especially useful for using the memory when a color is continuously changed with time or with position on an image. According to the external block sequence process, the memory can be used effectively when most image data have the same color.

Figure 16:
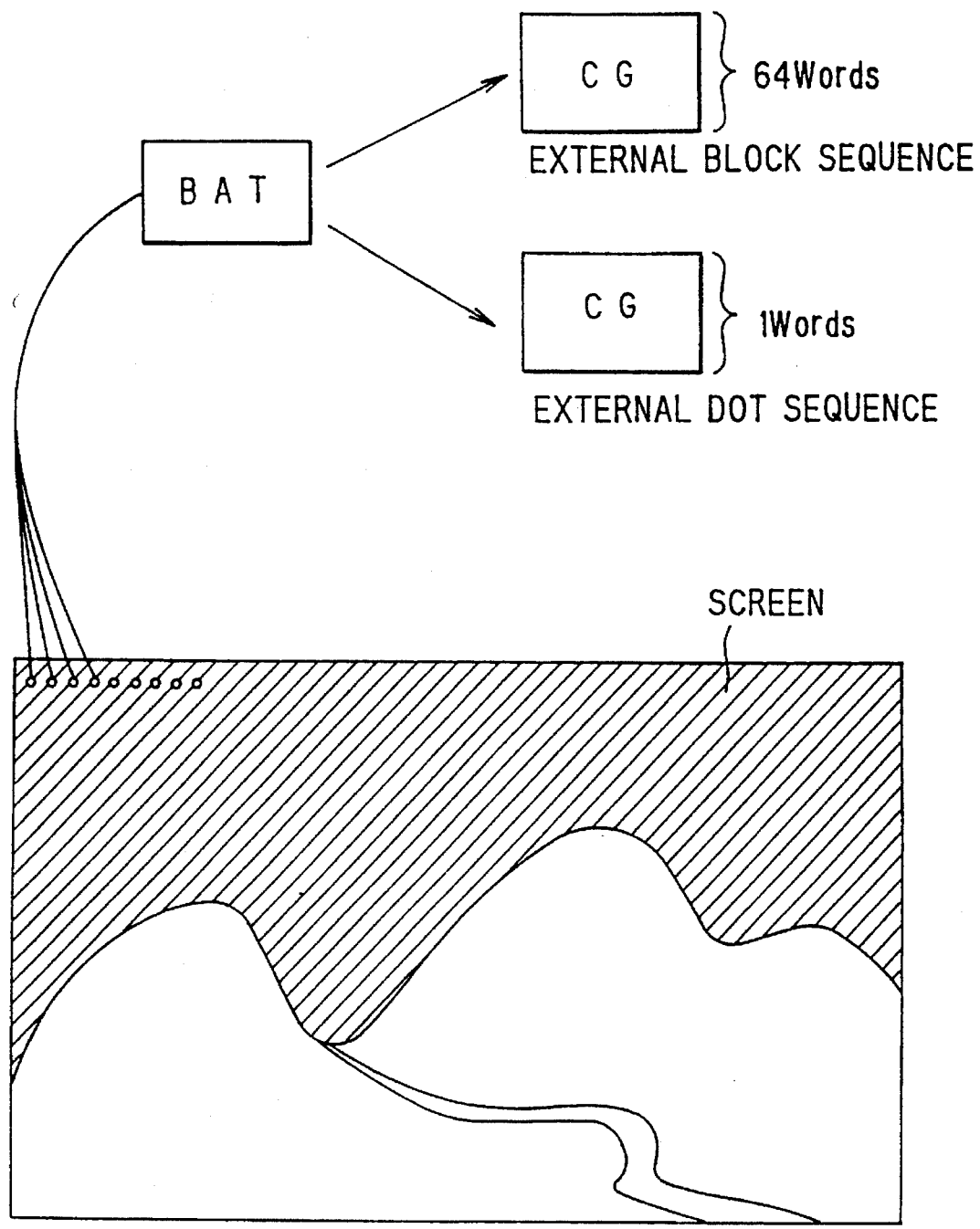
FIG. 16 is a diagram showing display processing for image data each having the same color, according to the conventional system.

The reason that the external dot sequence data are necessary to display the image is now explained in conjunction with FIG. 16. In a picture shown in FIG. 16, a single color is used for showing the sky, and the color varies with time. The 64K color mode is used to display the color of the sky more naturally. Either of the external block and external dot sequence types data are available in this case. When the external block sequence type data are used, 64 words (=1024 bytes) data must be stored in the CG, because the background is defined for each pattern of 8×8 dots by the CG. On the other hand, when the external dot sequence type data are used, one word (16 bytes) data only must be stored in the CG, because the background is defined for each dot.

According to the external dot sequence type data, if the color of the sky varies in the order of blue-white, light-red, red, dark-red, red-purple, dark-blue, and black, seven CGs are prepared and the character code is changed in the same order. In this case, the external block and external dot sequence types data need sizes (numbers) of CG of 64×(CG number) words and 2×(CG number) words, respectively. If the CG number is 8, the former becomes 512 words and the later becomes 16 words. Thus, the external dot sequence type data are useful in such a case.

It can be considered that the CG is used for the external dot sequence type data instead of the color pallet, because each CG directly specifies each color. Therefore, many colors may be used for displaying a picture by using a small capacity of the memory.

According to the external dot sequence type data, the screen may be colored red when the CG is set at red in an endless scroll mode, which is called "Chazutsu mode". In the endless scroll mode, when the real screen is scrolled out at one end from the virtual screen, the other end follows the one end to be displayed continuously.

(3) INTERNAL DOT SEQUENCE TYPE

In the internal dot sequence process, colors are defined for each dot in the same manner as the external dot sequence process. In the 16M color mode, two dot data may be defined by two words of YYUV. Therefore, 16M colors can be defined by the CG having a small capacity, and repeatability of the image is not seriously affected by the process. The internal dot sequence type data are especially useful for displaying a natural picture, in which each dot of the picture has independent color data. As mentioned before, according to the internal dot sequence process, picture data supplied from an external visual unit may be treated in the same manner as the others, and therefore, the processing of the image data becomes simple.

According to the conventional system, it is difficult to process the BG data for each block in the HSYNC or VSYNC period at a high speed, because the system manages not only the external block sequence type data but also the other types of data, and plural BG pictures are processed to be superimposed.

In the conventional computer system, the current address of the RAM is renewed by the CPU using a predetermined program or an increment operation.

Figure 17A:
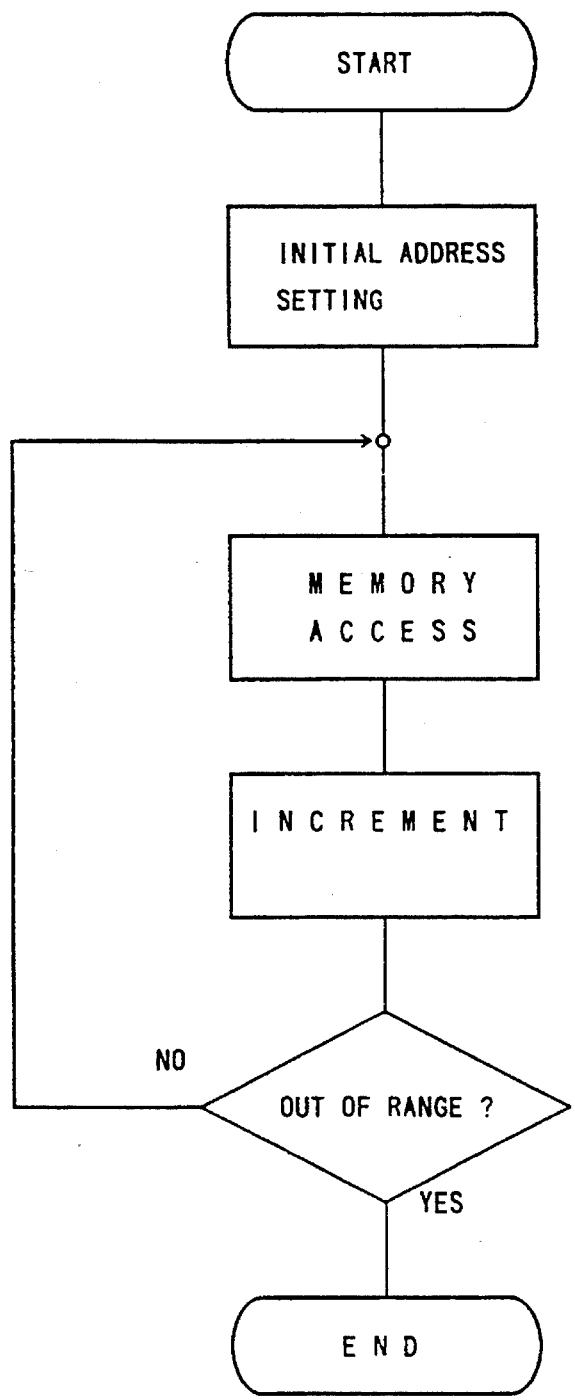
FIG. 17A is a flow chart showing processing for memory access, according to the conventional system.

FIG. 17A shows a flow chart for the increment operation for the data access. For example, when the data are accessed for each 32 blocks, the first address of the data to be read is accessed, and then the same process is repeated by adding the increment value to the current address. According to this method, continuous and interval memory access operations are realized by adjusting the increment value.

The increment process is useful for the computer system having a RAM of simple structure; however, it is not suitable for a multi-media computer such as a game computer treating a variety of data such as graphic, video, general, sound, etc.

Especially, the increment process is not suitable for a computer treating image data in plural modes. In this case, it is possible that the same data arrangement of the RAM is used for any data mode; however, it is not effective use of the RAM. Therefore, the data arrangement in the RAM must be changed depending on the mode in order to use the RAM effectively.

As described before, the background image is managed by using the BAT and CG in the VRAM. The BAT is arranged from the first address in the VRAM, and the CG is arranged at any region behind the BAT. According to the conventional computer system, the size and position of the BAT in the RAM are fixed. Therefore, a useless area is formed in the RAM, because the size of the image data varies depending on the type and kind of the data.

A long time ago, a sound source was generated in accordance with waveform data, which have been generated by a computer program based process. However, the quality of the sound source was low. For that reason, recently, sound data (analog signals) are converted into digital signals, so that the sound waves may be synthesized by an arithmetic operation.

In game computers, a programmable sound generator (PSG), which is small in size and has small capacity, is used. In the PSG, wave data supplied by a CPU are modulated in amplitude or frequency in order to generate a sound wave. The PSG may generate simple wave to produce noise. According to the PSG, it is easy to control the output sound; however, it is difficult to generate a variety of sounds.

According to a pulse code modulation (PCM) method, which is a method for A/D conversion, an analog signal is sampled at a predetermined interval. The sampled data are quantized, and then, are transformed to binary data to generate digital data.

According to a difference PCM method, the difference of the next two sampled data is quantized so that an output data amount is reduced. Further, according to an adaptive difference PCM method, the quantizing process is performed at a short pitch when the next two sampled data have a great difference, and on the other hand, the process is performed at a long pitch when they have a small difference. Therefore, the output data are more compressed.

The PCM and ADPCM data may be compatible with each other by using compression and extension coefficients composed of scale value and scale level. The sampling frequency of the ADPCM system used for a game computer is set at approximately 16 kHz.

In the conventional game computer, ADPCM sound data stored in an extra recording device are read by the CPU, and the data are extended by an ADPCM decoder in accordance with the scale value and scale level, so that the original sound is reproduced. The ADPCM decoder contains a synchronizing signal generating circuit, which generates a transmission rate by using a crystal resonator. The PCM data are reproduced in accordance with the transmission rate.

Recently, the game computer has not only a sound source such as PSG and ADPCM controlled by the CPU, but also an external audio device to realize high quality sound reproduction. For example, in a game computer using CDs (compact disks) as recording media, a CD player is used as the PCM sound source.

Generally, it is necessary that the position where the data are currently read in the memory is monitored by a user program, when the data are continuously processed. That is easy to realize if the data are read directly for specifying the address to be accessed. However, it is impossible to directly monitor the position where the ADPCM data are currently read to, because the RAM is accessed automatically at a predetermined interval. For that reason, the current position must be calculated based on the elapsed time, and therefore, the CPU must perform much processing. As a result, the computer can not operate at a high speed.

Figure 18:
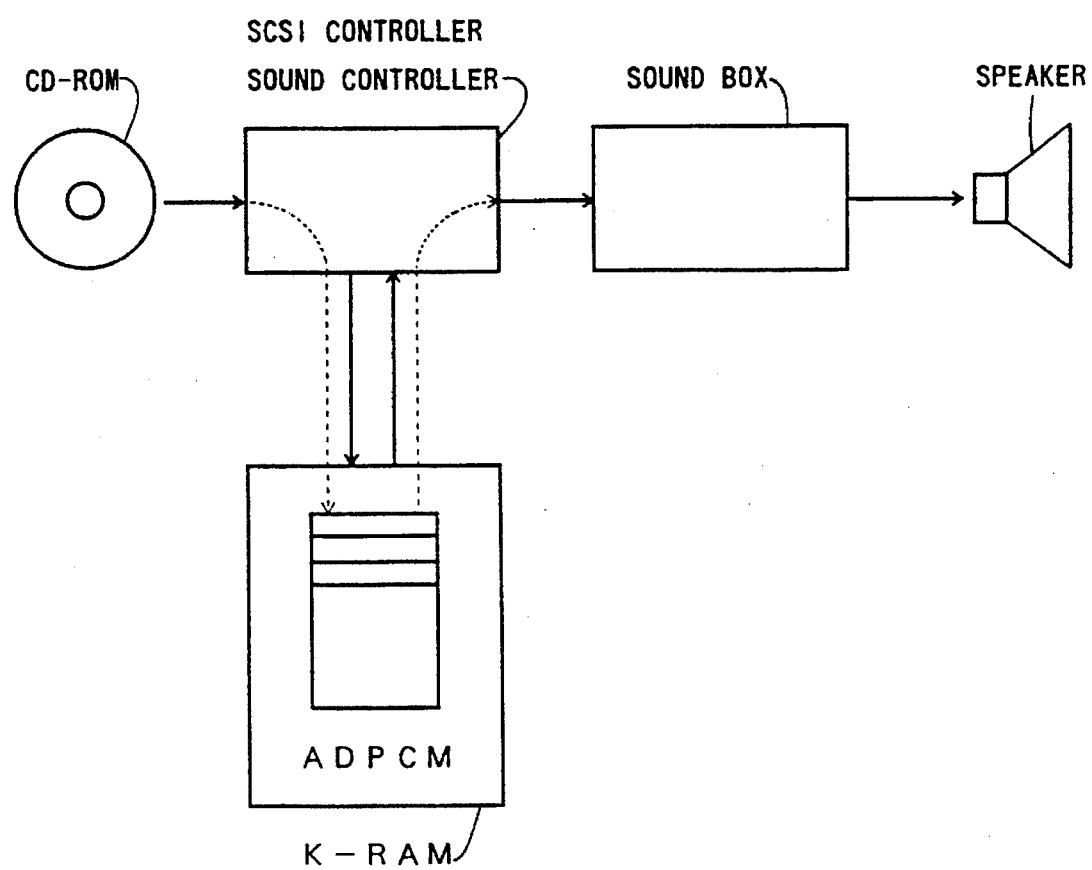
FIG. 18 is a diagram showing a process of sound data according to the invention.

FIG. 18 shows a sound reproducing system of the invention. In this system, sound data registered in a CD-ROM are read by a predetermined chip containing SCSI and controllers, and the read data are stored in an ADPCM area of the K-RAM. The sound data are transmitted to a sound reproducing chip (sound box) at a predetermined timing, and the sound data are reproduced to be supplied from a speaker.

The sound data may not be always wholly stored in the K-RAM because of the capacity limitation of the K-RAM. For that reason, the following sound data are stored in a data area where the previous data have been reproduced, as shown in FIG. 19. If all the following sound data are stored in the K-RAM after the previous sound data have been reproduced completely, output sound data are broken at some intervals.

According to the invention, hardware is structured to perform interrupt processing at a check point which is determined by a program. In a ring mode, in which the access point of the RAM is transferred from the end to start addresses for continuous reproducing, the interrupt processing is performed when the access point reaches an intermediate (middle) or the end address. Specifically, the first and last halves data are rewritten when the access point reaches the intermediate and end addresses, respectively, so that continuous reproducing is realized. In interrupt processing, the following data are written in the reproduced area of the RAM.

In this invention, an arithmetic process for accessing the K-RAM is programmed in the controller chip whereby a user may select access timing by using a register. VSYNC, HSYNC and DCK (dot clock) signals may be used as control signals.

Figure 20:
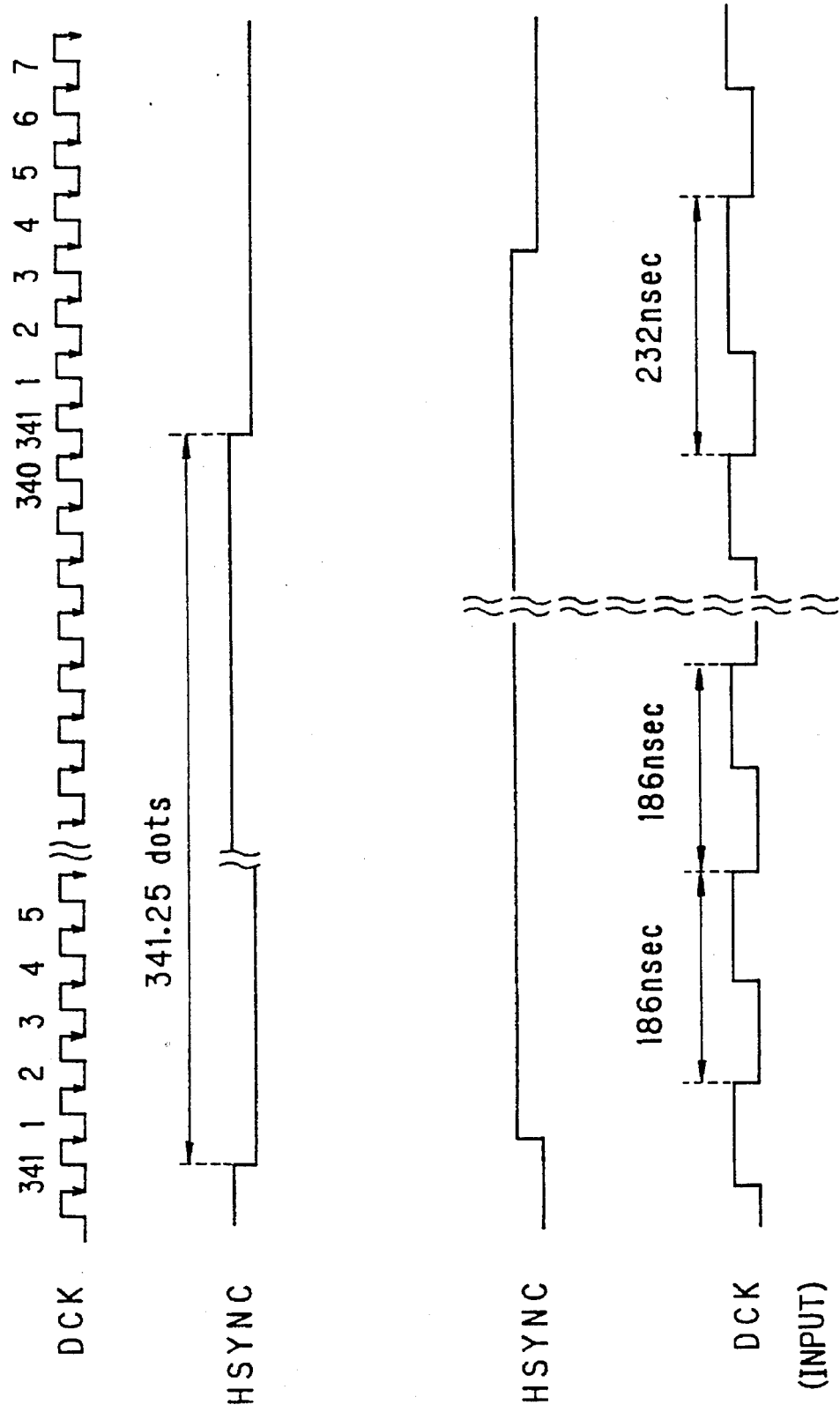
FIG. 20 is a timing chart showing a relation between DCK and HSYNC signals according to the invention.

FIG. 20 shows a time relation between the HSYN and DCK, the DCK of about 341 cycles being included in one HSYNC period. The RAM is accessed in accordance with the dot clock signal. A microprogram is loaded into a controller chip at a location specified in a microprogram load address register. When an initial address is specified in the register, the microprogram begins to be loaded. It is necessary that an MPSW in a microprogram control register be set at "0". After the loading of the microprogram, the microprogram begins operating when the MPSW is set at "1". A microprogram data register specifies which cycle is used for the access.

FIGS. 21A, 21B and 21C show the configurations of the microprogram control, microprogram load address and microprogram data registers, respectively.

FIG. 22 shows an actual configuration of the microprogram data register. The microprogram data register holds an access address of the K-RAM, the timing for generating the address, and the direction to which read data are transmitted.

According to the external block and external dot sequence types data, the BAT data are read first, and then the CG data are read using two dots. Description data are divided into two blocks (A bus and B bus), the following contents being included in the data.
(1) process/non-process (NOP/−NOP)
(2) BG screen number (0 to 3)
(3) rotation/non-rotation
(4) BAT/CG (BAT/−CG)
(5) BAT indirect CG/direct CG (indirect/−direct CG)
(6) CG offset The controller chip supplies BG screen data for each dot in synchronization with HDISP (horizontal display period). On the other hand, the microprogram operation is started and ended in synchronization with BGDISP (BG display period).

Figure 23:
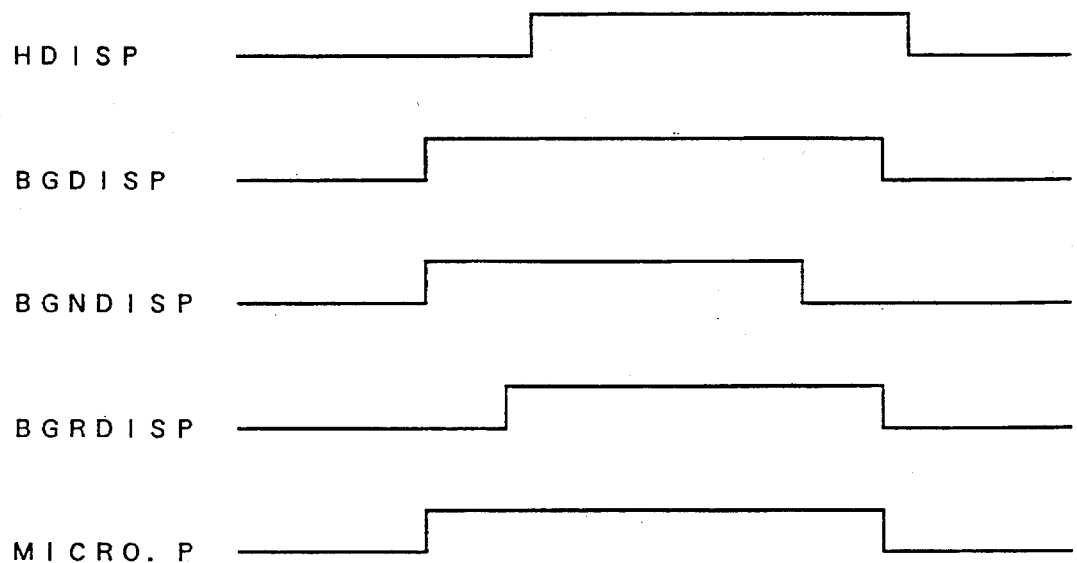
FIG. 23 is a timing chart showing a relation between operation and display periods of the microprogram according to the invention.

As shown in FIG. 23, the rotation process and non-rotation process have different delay times, so that non-rotation and rotation screens are processed in synchronization with BGNDISP and BGRDISP, respectively. Therefore, the microprogram operates in a MICRO.P period.

The graphic controller chip may manage five modes of 4, 16, 256, 64K and 16M color for each BG image, that is, the image data in the different color modes can be displayed simultaneously. Operation in 8-dot clock cycle is written in the two K-BUS units independently in accordance with the microprogram, so that the buses operate step by step independently and such that 8-dot clock cycle is repeated.

Figure 24:
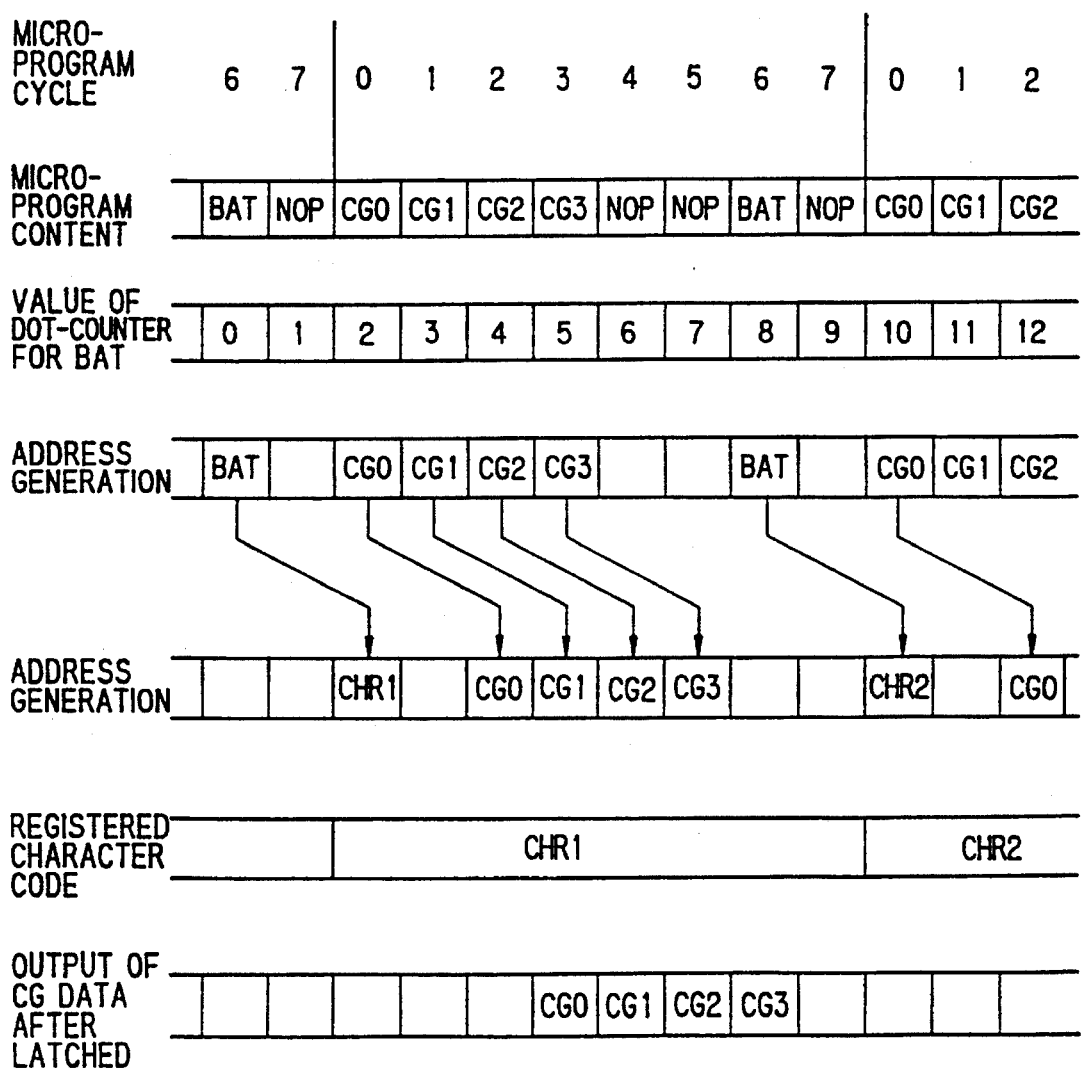
FIG. 24 is a diagram showing a process for generating address data by the microprogram according to the invention.

FIG. 24 shows a timing table for an address generating timing by the microprogram, the example being for a triple screen mode as shown below. FIG. 25 shows an example of the contents of the microprogram.
(1) BG0: 256-color mode of external block sequence type
(2) BG1: 16-color mode of external block sequence type
(3) BG2: 16-color mode of internal dot sequence type B-bus data are specified by "BG0 indirect CG (0)" in the 0 cycle, so that "external block sequence type 256 color mode BAT indirect CGO" is accessed in a BRAM. At this time an ARAM is not accessed, that is NOP (non-operation) is carried out in the ARAM.

According to the conventional system, the BG data are accessed during an interrupt period of video control signals, the access processing being performed for each character. If a variety of types of imaged data are managed by the conventional way, the system needs a very large electric circuit.

On the other hand, according to the invention, the BG data are accessed for each dot in accordance with a user program (microprogram), therefore, the RAM may be accessed effectively at a high speed.

Figure 26:
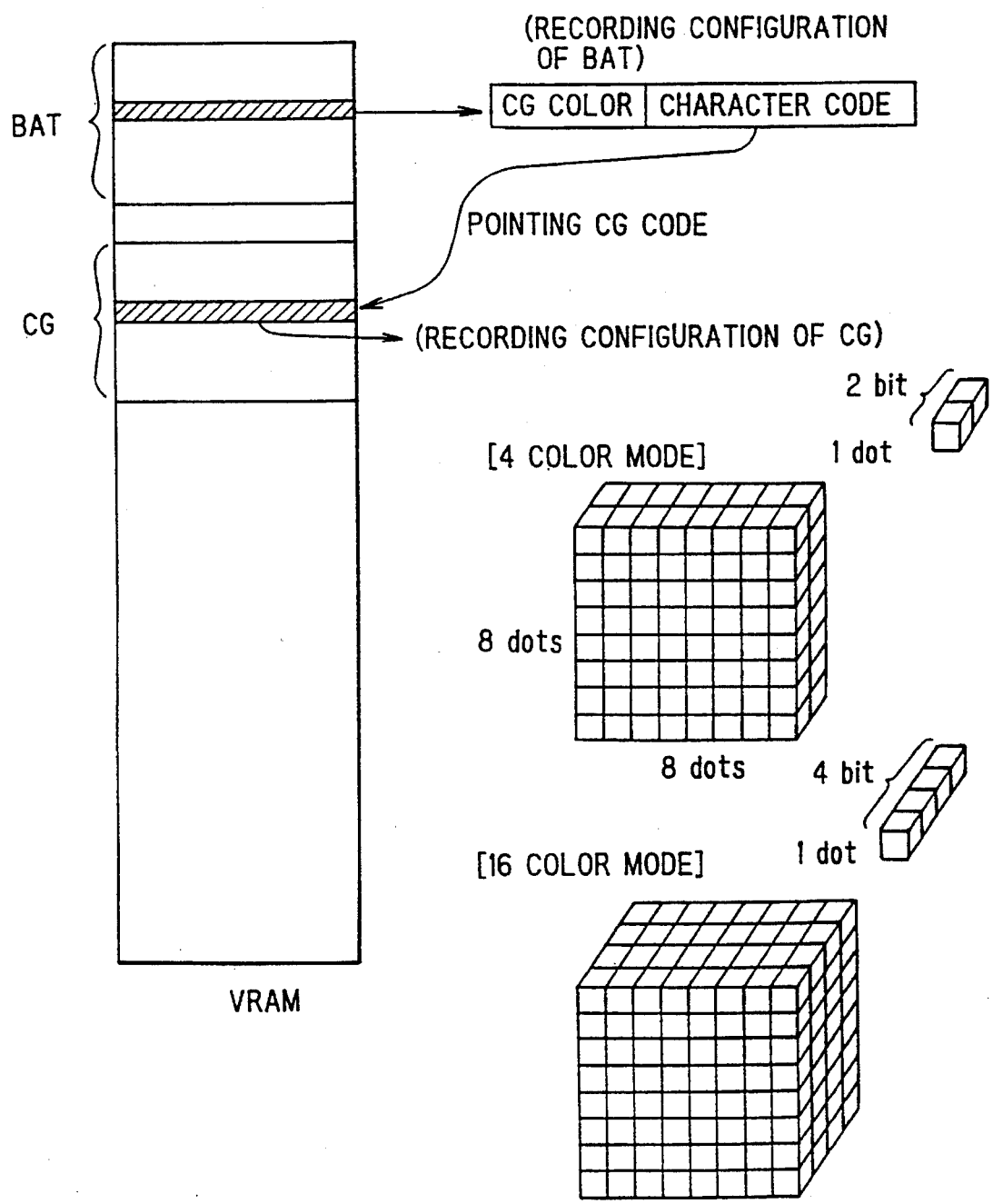
FIG. 26 is the data arrangement of a VRAM used in the computer system according to the invention.
Figure 27:
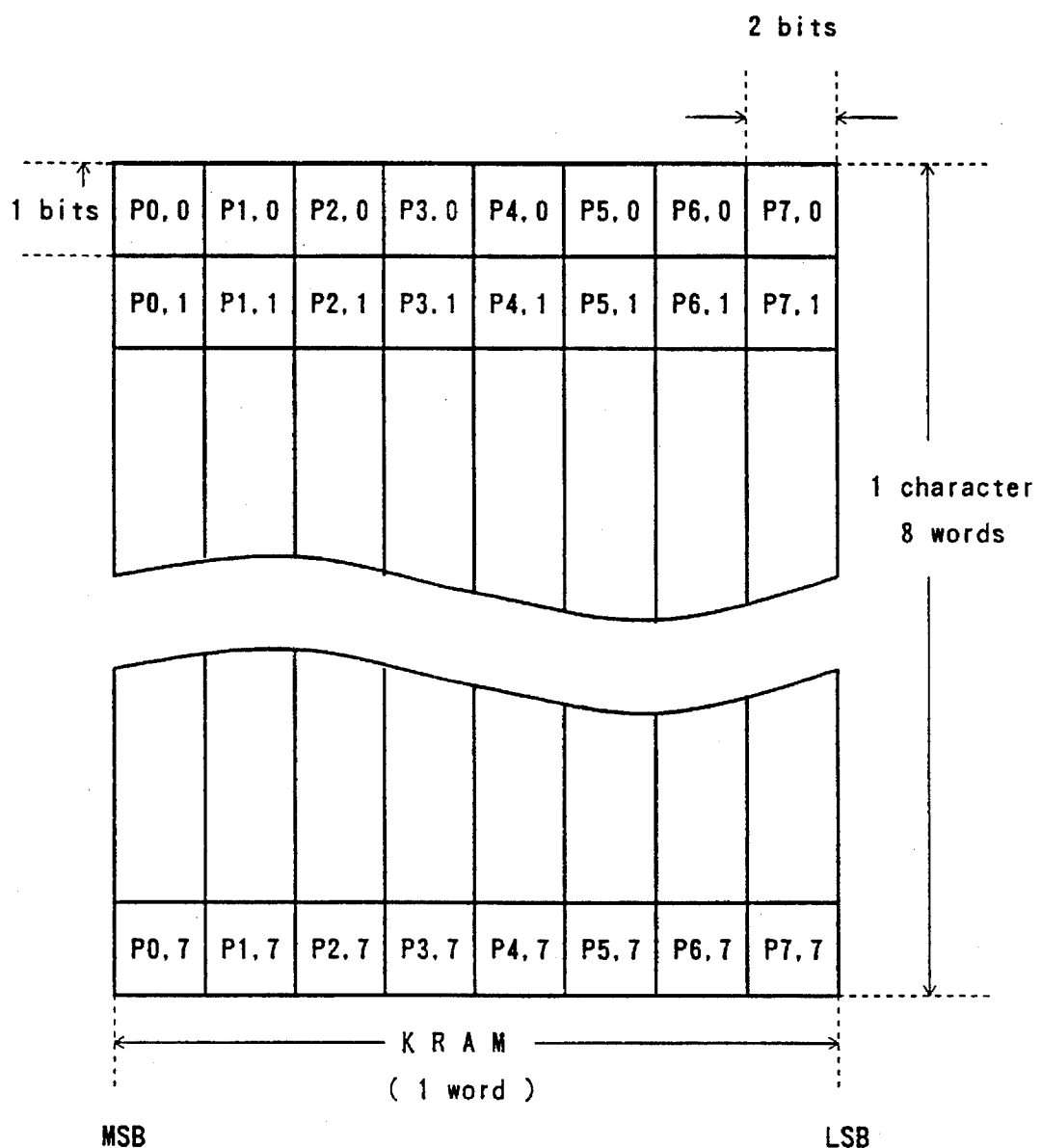
FIGS. 27 to 31 are diagrams showing the arrangements of CGs in a memory (K-RAM) operating in 4, 16, 256, 64K and 16M color modes, respectively, according to the invention.
Figure 28:
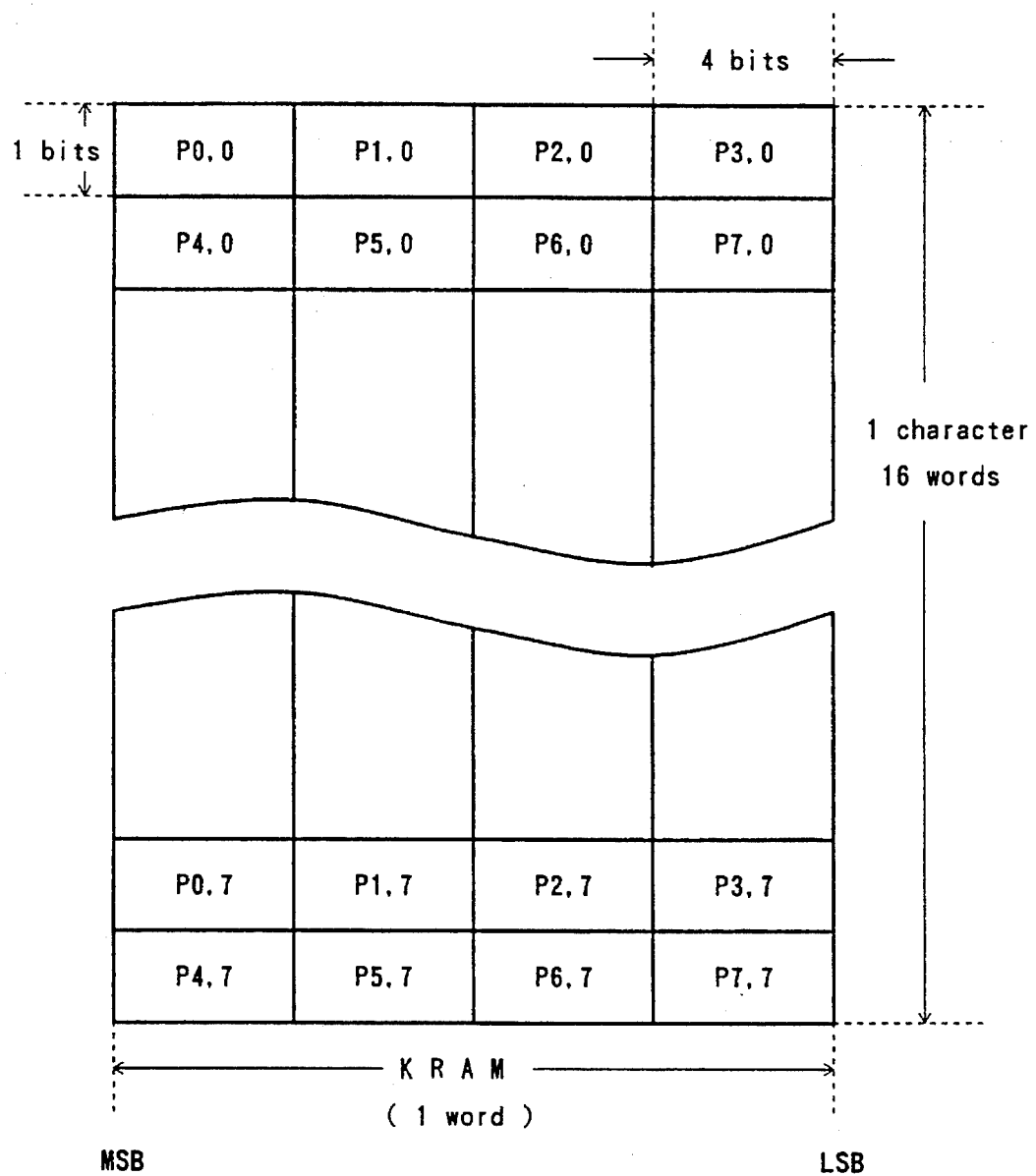
Figure 29:
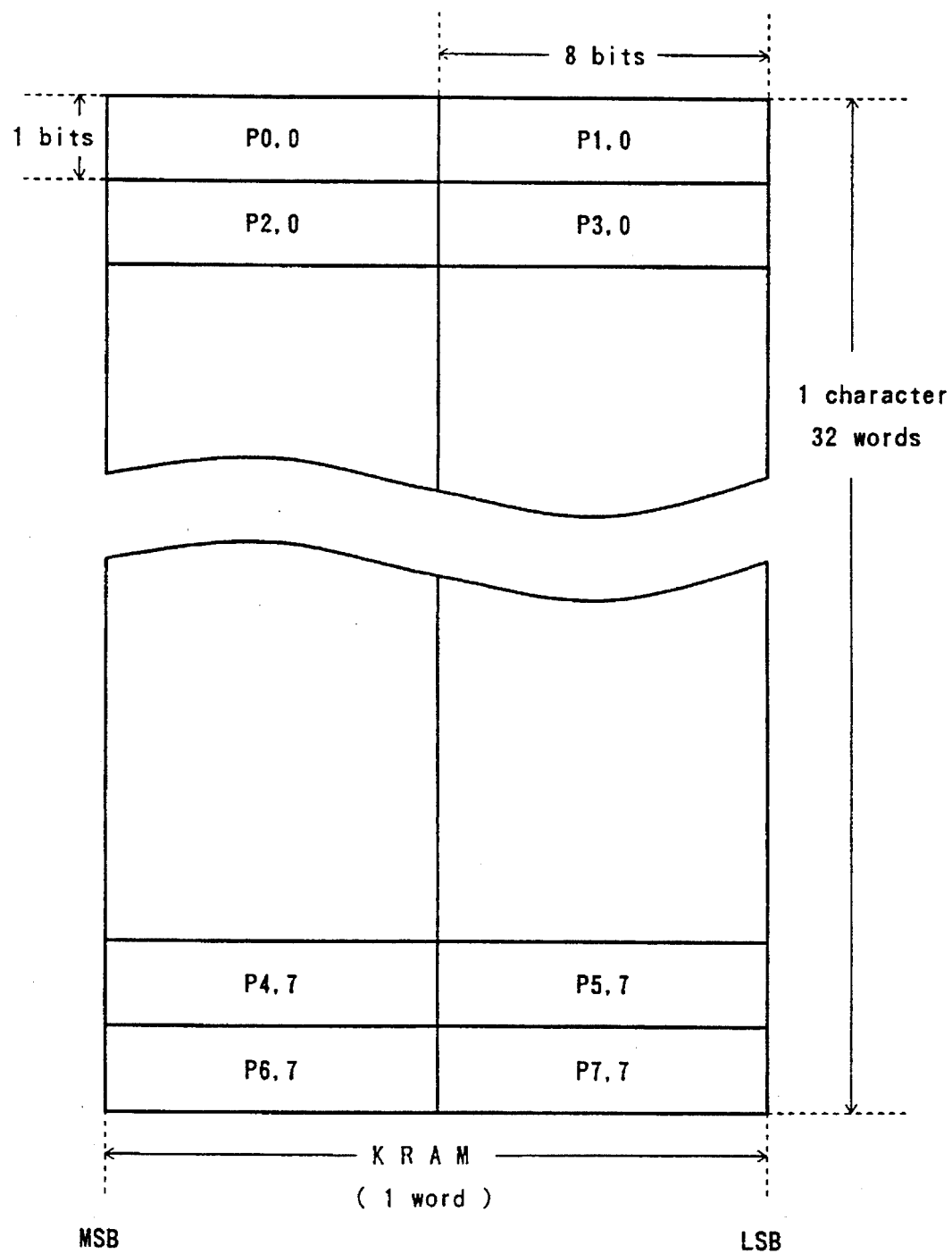
Figure 30:
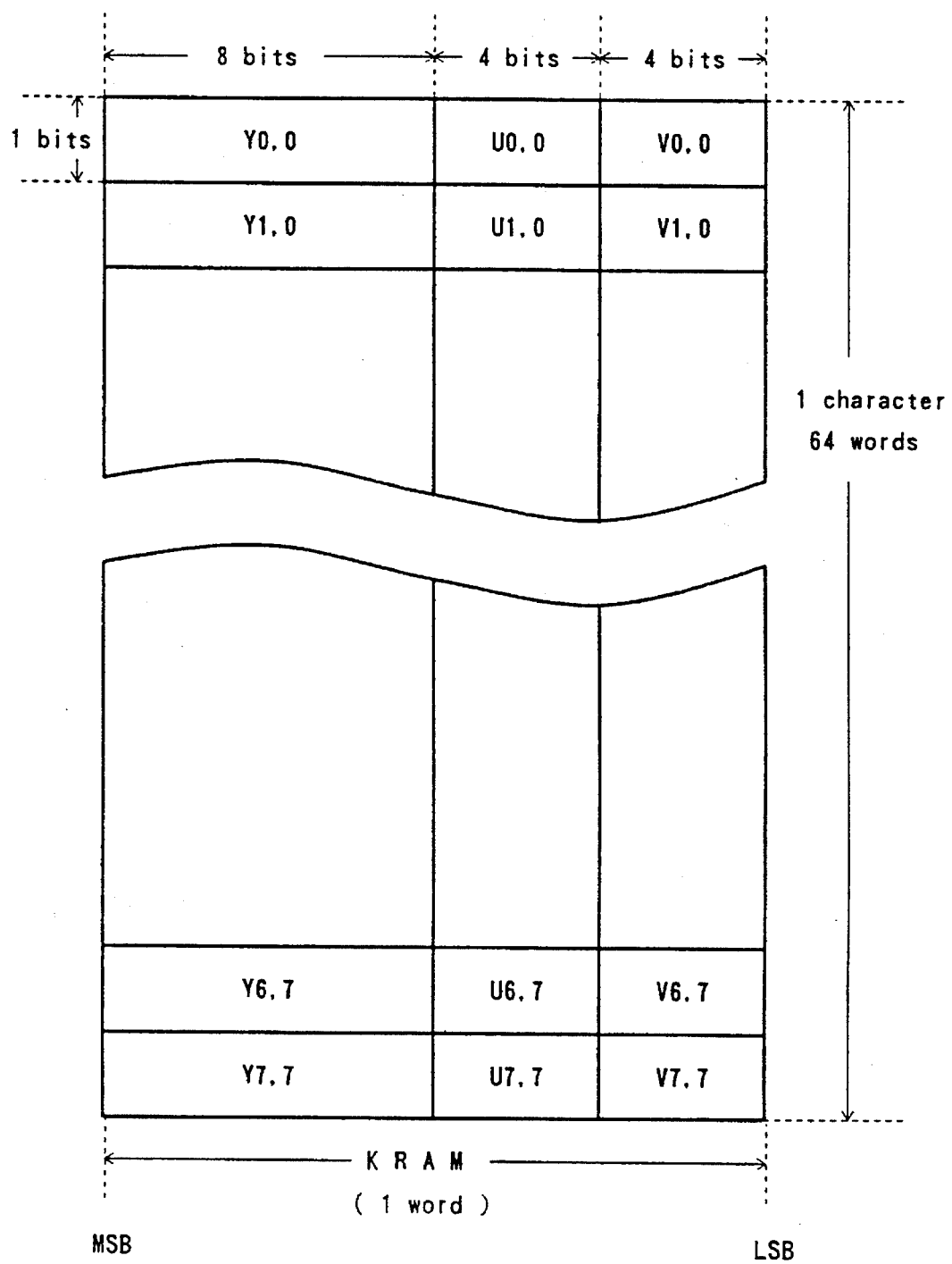
Figure 31:
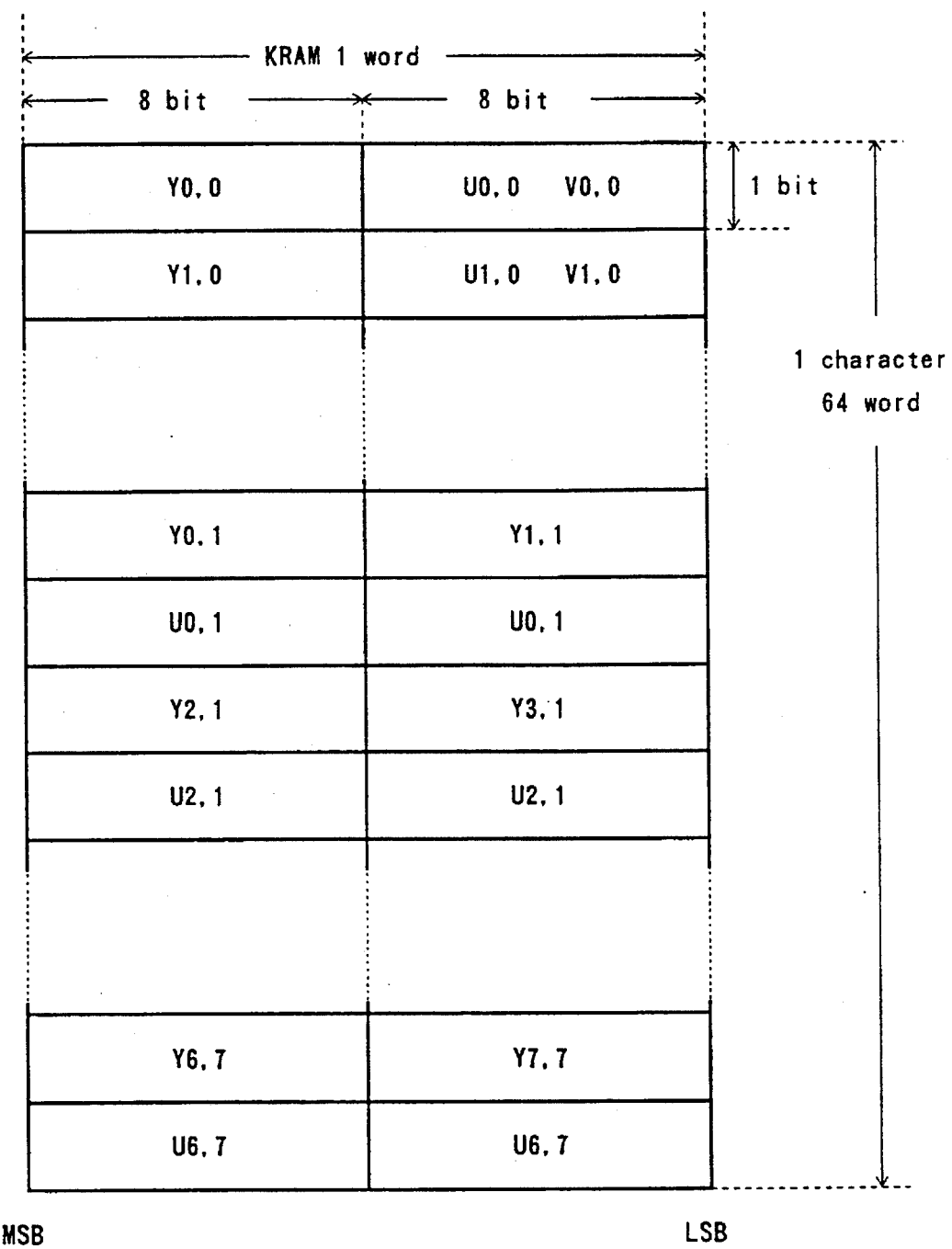

FIG. 26 shows the configuration of the VRAM, in which a part corresponds to the diagram show in FIG. 5. The background image is managed by using a background attribute table (BAT) and a character generator (CG) in the memory (VRAM). The length (bits) of the CG varies depending on the color mode. That is, the CG is composed of 2 and 4 bits in the 4 and 16 color modes, respectively.

FIGS. 27 to 31 show the memory arrangements in the 4, 16, 256, 64K and 16M color modes, respectively.

Figure 32:
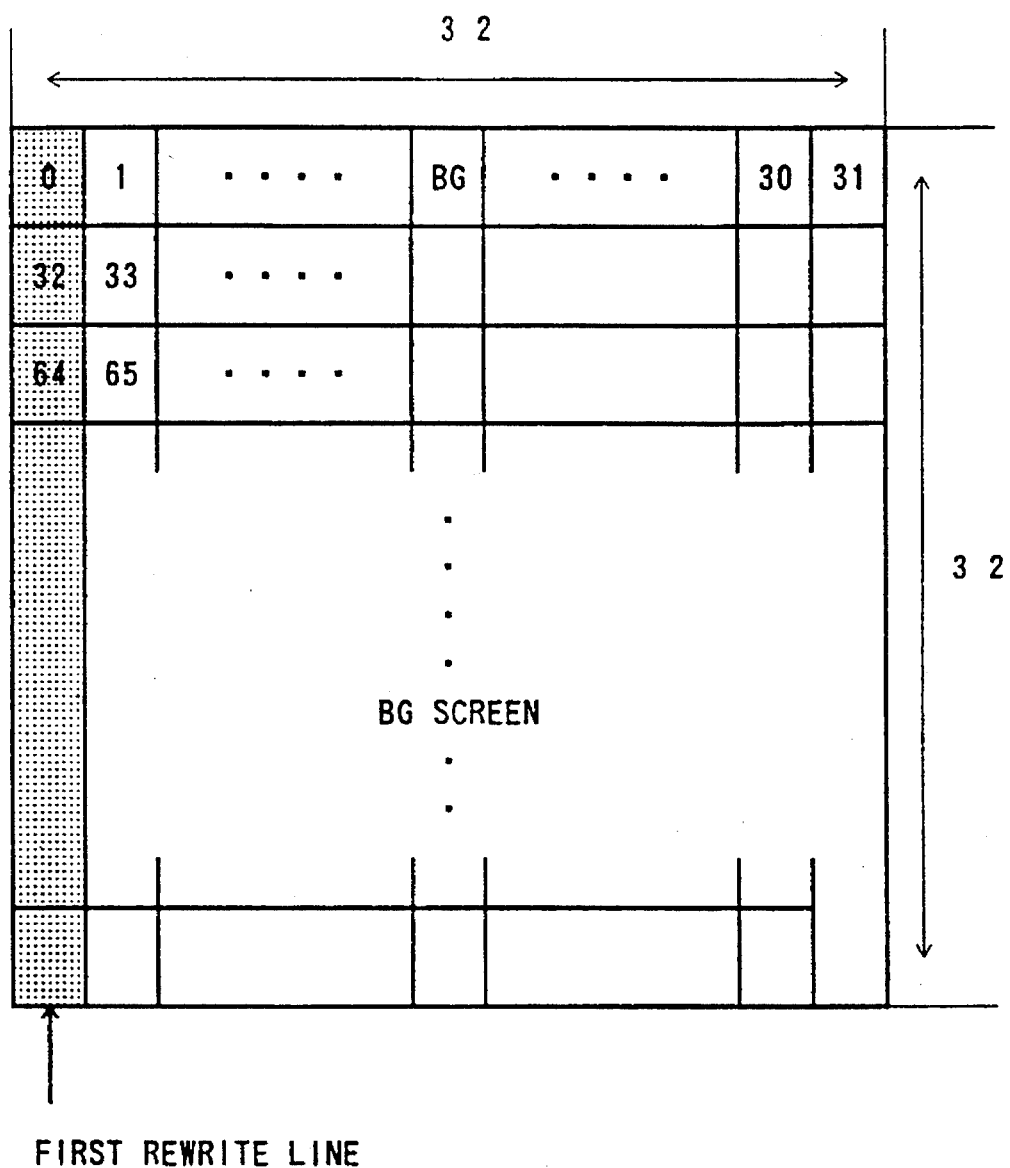
FIG. 32 is a diagram showing rewrite processing of a BG screen according to the invention.

Operation of the address calculating instruction will be explained, where a first line data of BG pictures each composed of 8×8 dots characters is changed. The BG pictures are arranged 32×32 dots on a screen, as shown in FIG. 32.

There are three types of registers one for reading, one for writing, and one for RAM access selection, these registers being used for memory access operation. The register for reading is set as follows to rewrite data stored in the first line of the BG screen:

Writing address (bit 0 to 17) : Initial address

Offset (bit 18 to 23) : 32

Figure 17B:
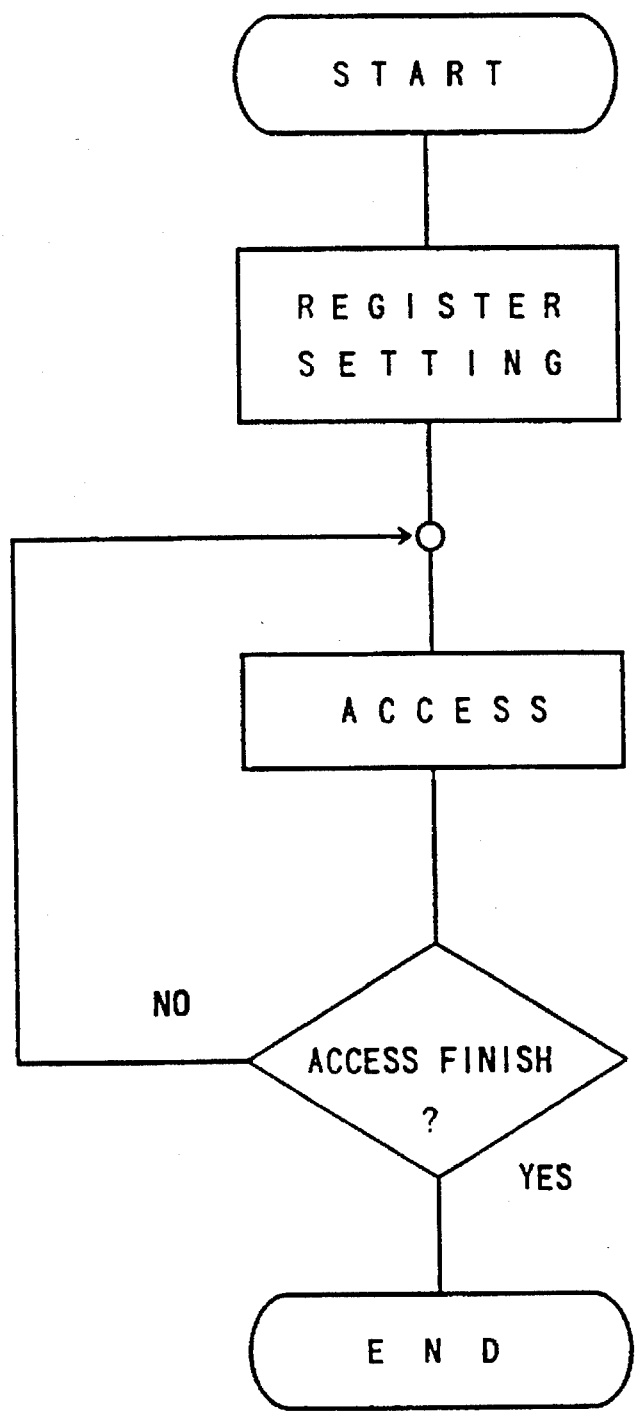
FIG. 17B is a flow chart showing a process for accessing a memory used in a computer system according to the invention.

The offset can be set in a range between −512 to +512, the "+" and "−" representing increasing and decreasing, respectively. In the above example, the offset is set at +32 (bits) so that BG data are rewritten at an interval of 32 bits. Such address calculation is carried out by a BG processing unit. As shown in the flow chart of FIG. 17B, when an access instruction is provided, the next access address is automatically calculated by the BG processing unit. Therefore, desired data processing may be carried out automatically as long as access instructions are provided continuously.

Figure 33:
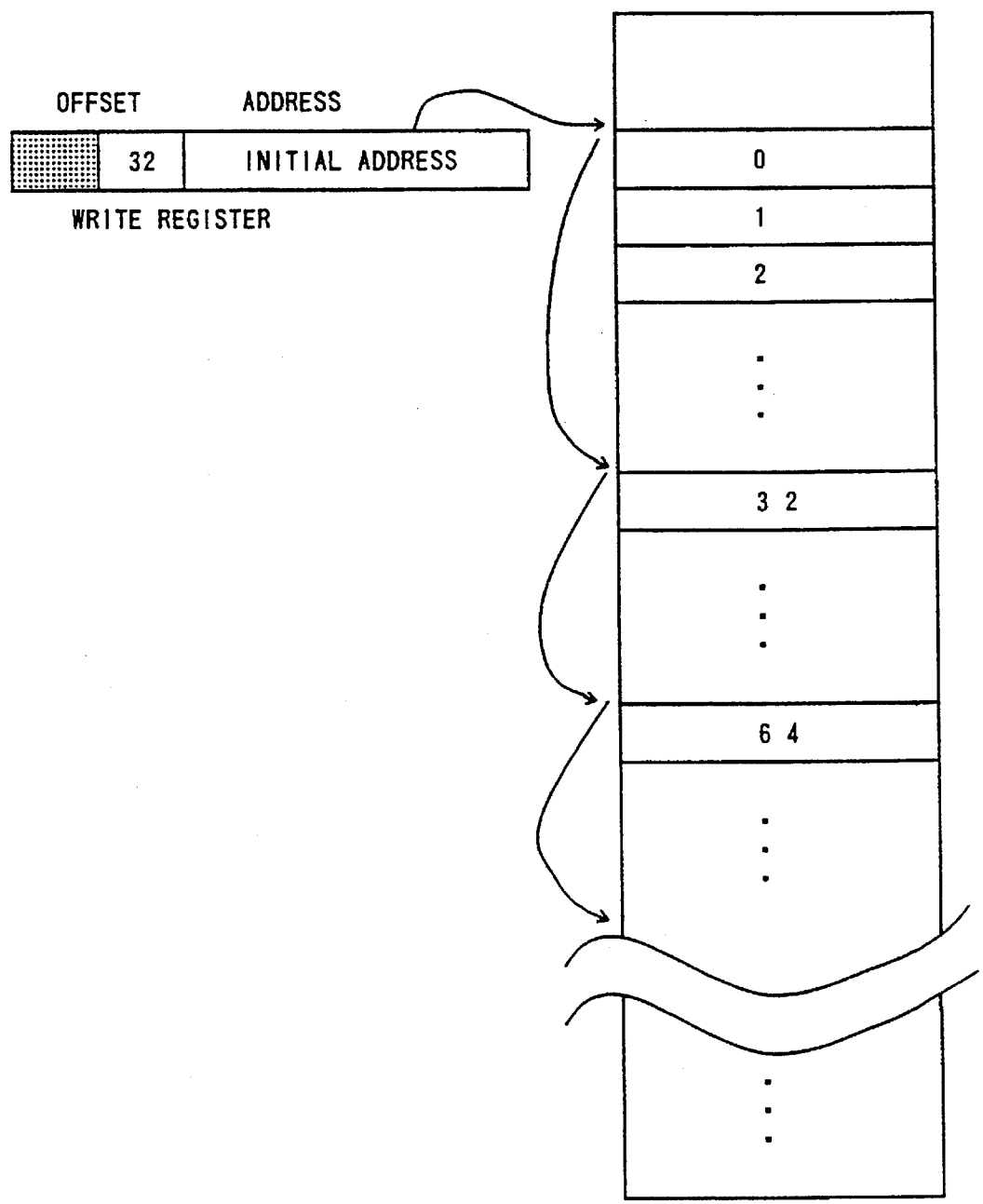
FIG. 33 is a diagram showing memory access processing according to the invention.

FIG. 33 shows memory access operation when the access instructions are carried out continuously. The BG processing unit includes two memories K-RAM#A and K-RAM#B, which are established in accordance with on/off of bit-17 in the writing address.

In this embodiment, image data are processed in 4, 16, 256, 64K and 16M color modes. An increment value of an address to be accessed is different depending on the color mode, when the image data are processed at a predetermined interval. When an area composed of continuous dots is processed, the offset is set at "1".

According to the embodiment, the start address and offset values are established in advance so that the address calculations are carried out by the system for the display mode. The increment processing is carried out by the hardware at a high speed, and therefore, the program becomes simple, and a debugging operation may be performed easily. Especially, the method is useful for graphic processing, in which display areas are regularly renewed.

The controller chip is provided With K-RAM start address and display size registers for specifying a start address of the BAT in the K-RAM and a display size, respectively. The K-RAM start address register holds BAT and CG addresses, as shown in FIG. 34.

In this embodiment, the BG image data include main and sub-pictures. The main picture is displayed on the sub-picture. In the BG0 picture, each of the BAT and CG has its own address register so that the main and sub-pictures are managed independently. Each BG0 picture has four address registers. In the BG1 to BG3 pictures, the BAT and CG have one address register so that each of the main and sub-pictures has one register. The K-RAM includes an ARAM and a BRAM. The ARAM and BRAM are selected when A/B =0 and A/B =1, respectively. In the address register, "–A/B" at the seventh bit indicates whether the ARAM or BRAM is selected.

Figure 35:
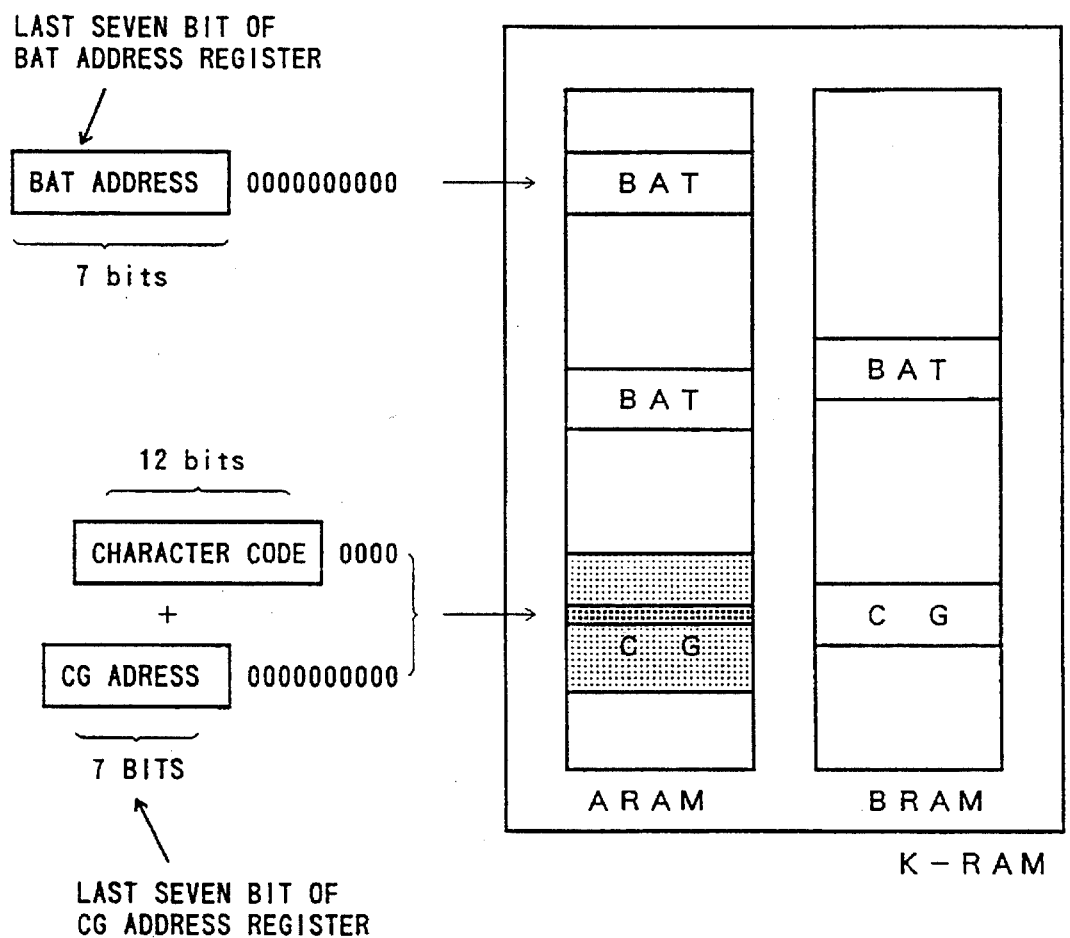
FIG. 35 is a diagram showing a process for pointing an address by the start address register according to the invention.

FIG. 35 shows a relation between a BAT/CG address register and the K-RAM. An address of the BAT is defined by figures at the last seven bits and ten bits of zero in the BAT register. An address of the CG is given as follows in accordance with the color modes:

[4 COLOR MODE]

00<character code>000+<CG address>0000000000

[16 COLOR MODE]

0<character code>0000+<CG address>0000000000

[256, 64K and 16M COLOR MODES]

<character code>00000+<CG address>0000000000

In these formulas, <character code> indicates the content of the BAT and <CG address> indicates the last seven bits of the CG address register. In the character codes, the end bit is set at "0" in the 256 color mode and the end two bits are set at "00" in the 64K and 16M color modes. Therefore, as long as the CG addresses are different from each other, different types of the CG may be obtained even though the same BATs are stored in the RAM.

The address registers are sampled for each raster, and are effective from the following HSYNC (HSYNC: a non display period in that a scanning line moves from left to right and returned to the left).

Figure 36:
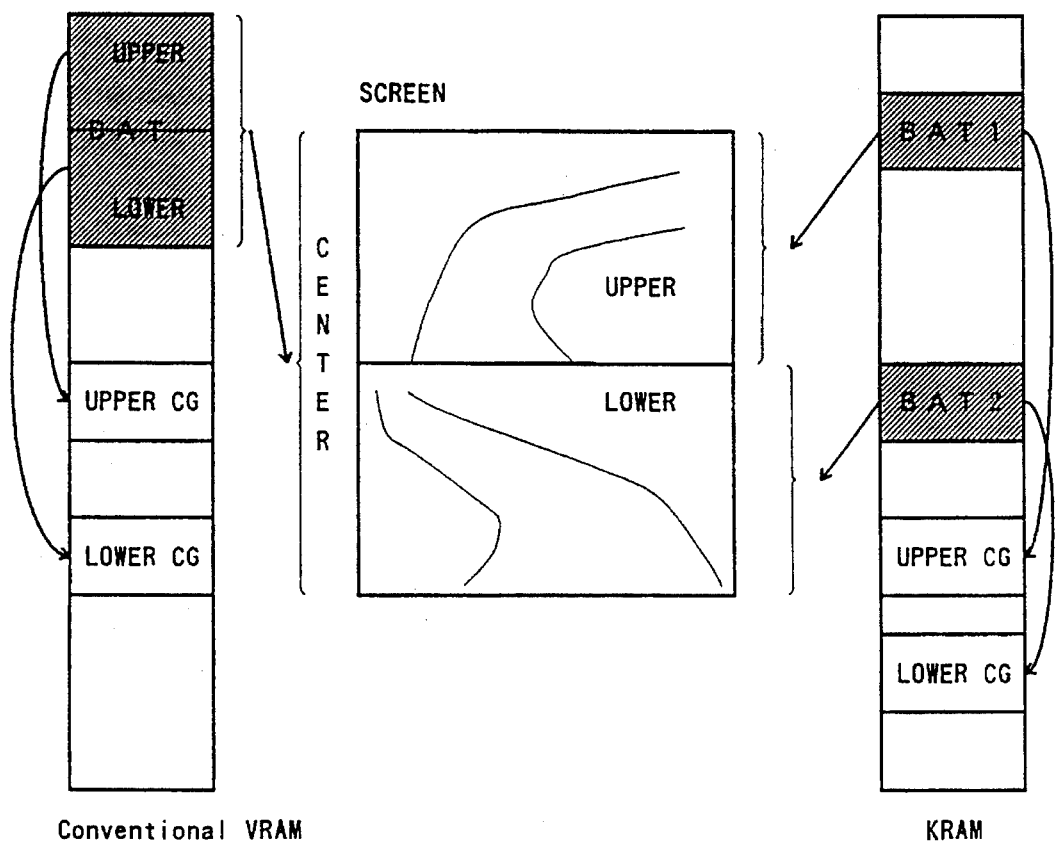
FIG. 36 is a diagram showing a display example processed by the computer system according to the invention.

FIG. 36 shows an example of the background image, in which a screen is divided into two of upper and lower regions.

According to the conventional BAT, two CGs for the lower and upper regions are required to form the picture in this case, because the conventional BAT treats continuous regions only. The CGs may be arranged to be linked to each other or separated by some space. The picture is displayed only by a continuous process of the BAT. A lower half character code of the BAT must be changed to the CG of the following picture in order to change the lower picture only.

This process takes a long time, and therefore, the upper and lower pictures can not be displayed separately quickly.

According to the preferred embodiment, the upper and lower pictures are stored in BAT1 and BAT2 separately. The locations of the BAT1 and BAT2 are not limited in the K-RAM. The K-RAM includes upper and lower CGs corresponding to the BAT1 and BAT2, respectively. In order to display the upper and lower pictures independently, the BAT address register is set at an address of the BAT1 at first, and then the set address is changed to an address of the BAT2 (BAT1), because an address in the BAT address register is effective before the following HSYNC. If only the upper picture is changed, another BAT is prepared in the K-RAM, and the BAT address is changed.

According to the conventional system, which does not use the BAT address register, it is impossible for two operators to play a game using the upper and lower screens separately.

Figure 37:
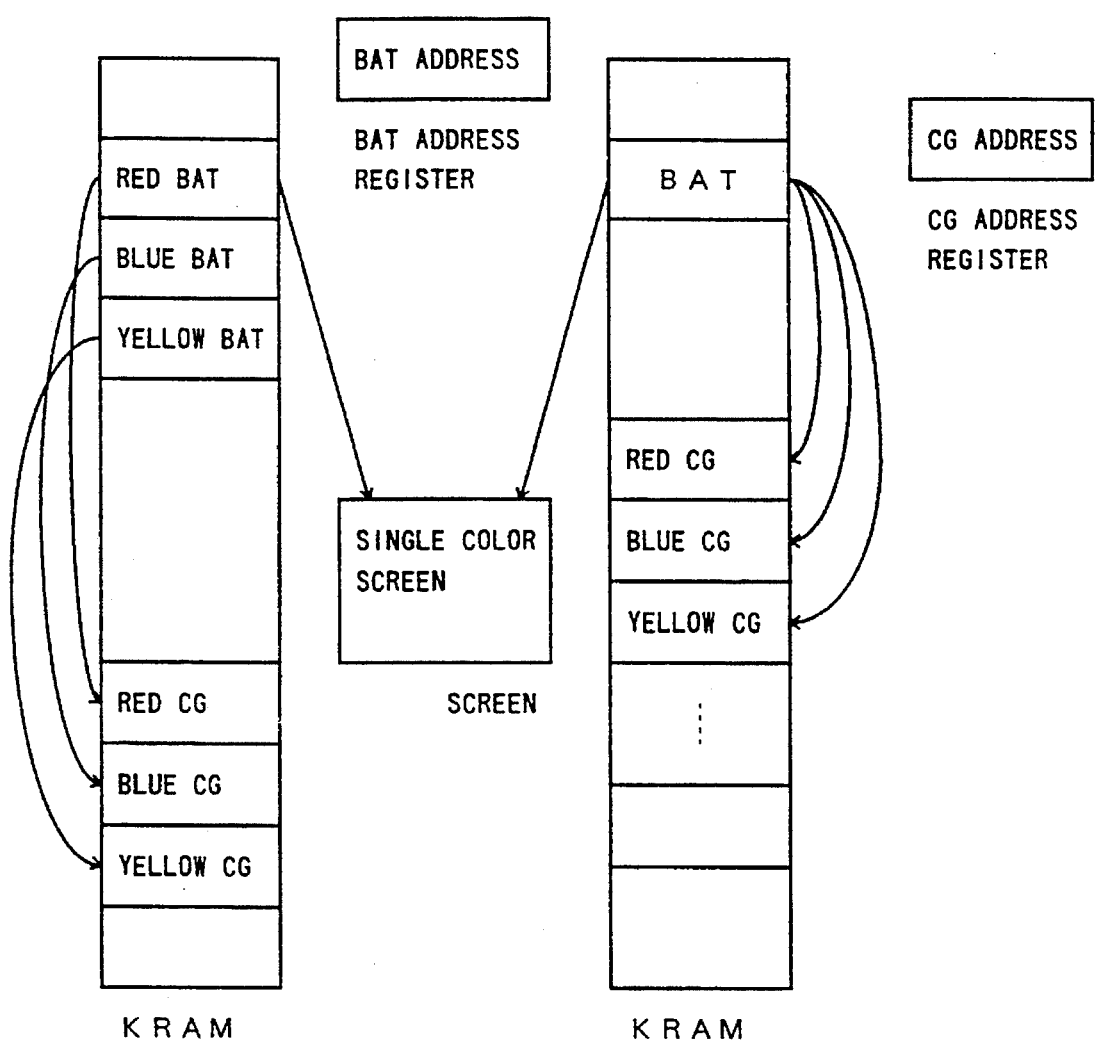
FIG. 37 is the data arrangement of the K-RAM in a single color mode according to the invention.

The BAT and CG address registers may be used to display a screen whose color changes from red through blue to yellow throughout. This process is carried out in the endless scroll mode (Chazutsu mode). When a KRAM, shown at the left in FIG. 37, storing three pairs of BAT and CG is used, a BAT address is changed in the VSYNC period. On the other hand, when a KRAM, shown at the right in FIG. 37, storing a single bat and plural CGs is used, a CG address is changed in the VSYNC period. In these cases, one word (16 bits) and two words are sufficient for the BAT and CG, respectively, even in the 16M color mode.

According to the invention, only the required BAT area is used, so that the memory may be used effectively. Further, the screen may be easily divided in a horizontal direction, because the BAT address register is effective in the HSYNC period.

Figure 38:
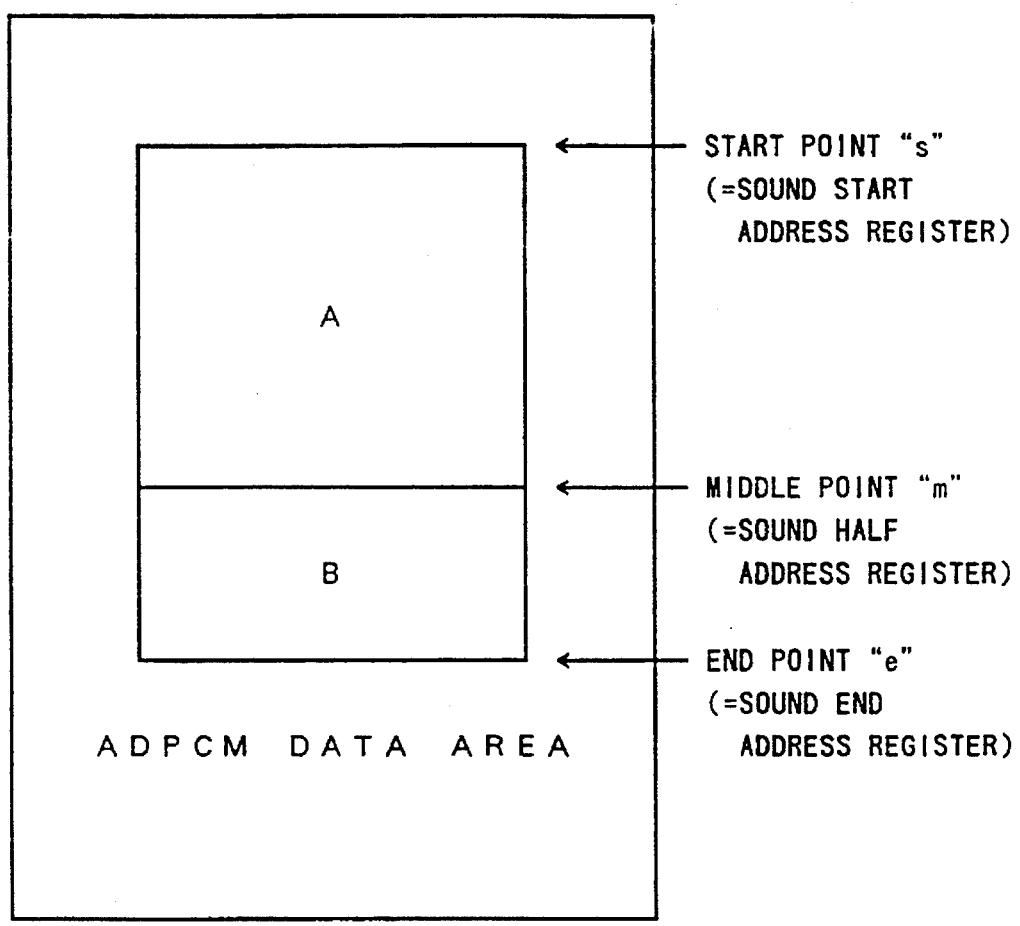
FIG. 38 is a diagram showing a relation between a sound address register and an ADPCM data area according to the invention.

FIG. 38 shows an ADPCM data area in the KRAM. In the sound controller, a check point where interrupt processing is carried out from is specified by a sound half address register. The sound half address register includes first and second registers for channels one and two. Now considering the case using channel one only, whether the interrupt processing is carried out is controlled by a sound buffer control register. When the interrupt processing is carried out at middle and end points "m" and "e", the sound buffer control register has the following modes.

RING BUF=1(RING BUFFER MODE)

BUF END=1(INTERRUPT AT END POINT)

BUF HALF=1(INTERRUPT AT MIDDLE POINT)

In the ring buffer mode, when the sound data at the end point are read, the sound data at the start point are automatically read again. The start and end points are specified by sound start address and sound end address registers, respectively. The first sound half address register holds the middle point address of the ADPCM data.

Figure 39:
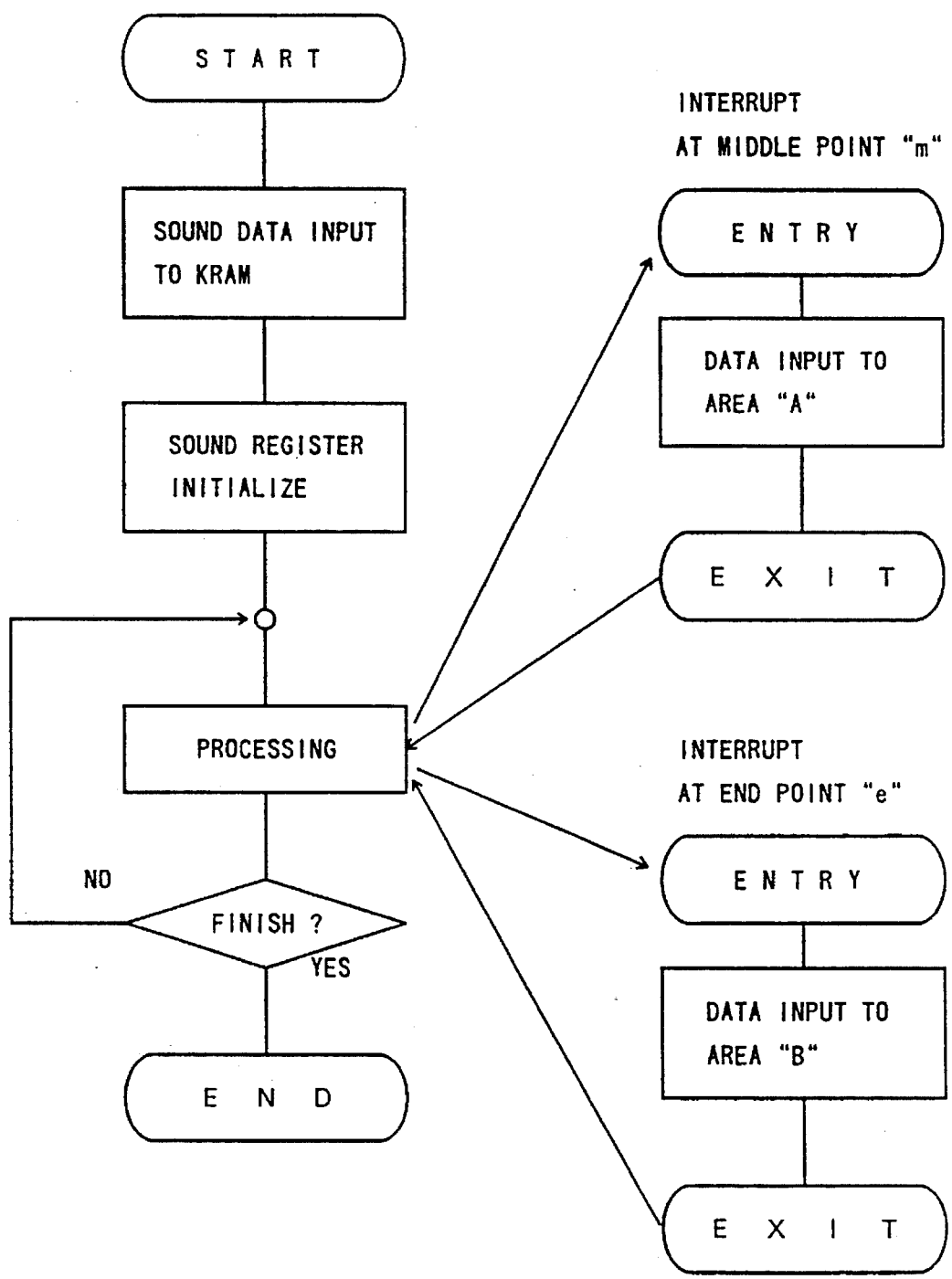
FIG. 39 is a flow chart showing interrupt processing performed at a middle point in the memory according to the invention.

In this case, when interrupt processing is carried out at the point "m", the following data are written in an area "A" where the previous data have already been processed, as shown in FIG. 39. When interrupt processing is carried out at point "e", the following data are written in an area "B" where the previous data have already been processed.

In FIG. 39, "processing" includes processes for preparing display of image, generating sound in the sound box, transmitting sound data from the K-RAM, and the like. These processes are set in registers so that the processes are carried out automatically without a user program. The interrupt processing at the middle and end points begin automatically by the system using the sound registers; however, interrupt processing must be carried out by user.

According to the invention, a position where the processing is currently running is not required by the user program during other processing, and therefore, the computer system may work at a high speed. The effect is especially remarkable for long time sound reproduction.

We claim:

1. An image processing apparatus, in which plural images are displayed in various display modes in synchronization with video synchronizing signals, comprising:

a memory for storing image data of said images;

means for generating dot clock signals;

mode specifying means for specifying a display mode from the various display modes to each of said images to be displayed;

selecting means responsive to the mode specifying means for selecting one from between said dot clock signals and said video synchronizing signals for each display mode; and processor means responsive to said selecting means for processing said image data within blanking intervals of said video synchronizing signals when the video synchronizing signals are selected by said selecting means and for processing said image data in synchronization with the dot clock signals when the dot clock signals are selected by the selecting means.

2. An image processing apparatus, according to claim 1, wherein;

said plural images are plural background images.

3. An image processing apparatus, in which image data are displayed in various color modes, comprising:

a memory for storing said image data arranged differently depending on said color mode;

offset address means for specifying an offset address for each of said color modes, said offset address means including plural registers each holding a corresponding offset address;

start address means for specifying a start address for each of said color modes;

calculation means, responsive to said offset address means and start address means, for calculating an address from said specified start address and said specified offset address; and addressing means responsive to said calculation means for addressing the memory in accordance with the calculated addresses.

4. An image processing apparatus, in which plural BG (background) pictures are displayed on a screen, comprising:

a plurality of BATs (Background Attribute Tables) each for managing corresponding BG picture;

a memory for storing said plural BG pictures, which are managed by various of said plurality of BATs (Background Attribute Tables);

registers for holding start addresses of said BATS; and means responsive to said registers for accessing each of said BATs in the memory from the start address thereof.

5. An image processing apparatus, according to claim 1, wherein:

said various display modes comprises a dot sequence mode, in which said image data are processed for each dot thereof, and a block sequence mode, in which said image data are processed for each block thereof; and said selecting means selects said dot clock signals and said video synchronizing signals to the dot sequence mode and block sequence mode, respectively.

* * * * *